US007475109B1

(12) United States Patent
Fletcher et al.

(10) Patent No.: US 7,475,109 B1
(45) Date of Patent: *Jan. 6, 2009

(54) PERSONALIZED AUTO-REPLY MESSAGES BASED ON CATEGORIES

(75) Inventors: George Fletcher, Round Hill, VA (US);
W. Karl Renner, Great Falls, VA (US);
Kevin E. Greene, Arlington, VA (US)

(73) Assignee: AOL LLC, Dulles, VA (US)

( * ) Notice: Subject to any disclaimer, the term of this patent is extended or adjusted under 35 U.S.C. 154(b) by 823 days.

This patent is subject to a terminal disclaimer.

(21) Appl. No.: 10/743,016

(22) Filed: Dec. 23, 2003

Related U.S. Application Data

(63) Continuation-in-part of application No. 10/425,709, filed on Apr. 30, 2003, now Pat. No. 7,334,021.

(51) Int. Cl.
*G06F 15/16* (2006.01)
*G06F 15/173* (2006.01)
*G06F 15/177* (2006.01)

(52) U.S. Cl. ...................... 709/204; 709/206
(58) Field of Classification Search .............. 709/206, 709/200–203, 217–228, 204
See application file for complete search history.

(56) References Cited

U.S. PATENT DOCUMENTS

| 6,640,230 | B1 | 10/2003 | Alexander et al. |
| 6,988,128 | B1 | 1/2006 | Alexander et al. |
| 7,035,865 | B2 | 4/2006 | Doss et al. |
| 2004/0145608 | A1* | 7/2004 | Fay et al. .................. 345/758 |
| 2005/0004984 | A1* | 1/2005 | Simpson .................. 709/205 |

OTHER PUBLICATIONS http://web.mit.edu/olh/Zephyr, "Zephyr on Athena (AC-34) Draft Table of Contents," Nov. 18, 2002, 25 pages.
http://www.stanford.edu/~kmitev/zephyr.html, "UNIX: Using Zephyr on Glue and WAM," Nov. 18, 2002, 8 pages.
http://office.microsoft.com/assistance/2002/articles/Olrwautoreply2.aspx, "Have Microsoft Exchange Server Send Custom Reply Messages with Outlook 2002," Mar. 11, 2003, 1 page.
http://www.fnal.gov/docs/products/zephyr.html, "zephyr—Zephyr Notification Service," Nov. 18, 2002, 2 pages.
http://support.gfi.com/manuals/en/mes8/configuringautoreplies2.htm, "Configuring Auto Replies," Jun. 4, 2003, 2 pages.
http://www.brunoblondeau.com/macresponder/, "MacResponder Automated E-mail Responder for When Your Unavailable," Jun. 20, 2003, 6 pages.
Notice of Allowance in co-pending U.S. Appl. No. 10/425,709 dated Aug. 27, 2007, 16 pages.
Office Action in co-pending U.S. Appl. No. 10/425,709 dated Jun. 12, 2007, 11 pages.
Office Action in co-pending U.S. Appl. No. 10/425,709 dated Feb. 2, 2007, 12 pages.

* cited by examiner

*Primary Examiner*—Nathan Flynn
*Assistant Examiner*—Haresh N Patel
(74) *Attorney, Agent, or Firm*—Fish & Richardson P.C.

(57) ABSTRACT

An interface is provided to the user of an e-mail client program. The interface allows the user to organize his or her contacts into categories and may display representations of the user's e-mail contacts in a manner that indicates to which category the contacts belong. The user may use the interface to set customized auto-reply messages on a per-category basis, or otherwise.

28 Claims, 29 Drawing Sheets

PERSONALIZED AUTO-REPLY MESSAGES BASED ON CATEGORIES

CROSS-REFERENCE TO RELATED APPLICATIONS

This application is a continuation-in-part application of and claims priority to U.S. application Ser. No. 10/425,709, now U.S. Pat. No. 7,334,021 filed on Apr. 30, 2003.

TECHNICAL FIELD

This description relates to away messages used in instant messaging and auto-reply messages used in e-mail.

BACKGROUND

With the advent of the Internet and a decline in computer prices, many people are communicating with one another through computers interconnected by networks. A number of different communications programs have been developed to facilitate such communications between computer users. One type of communication program is the instant messaging (IM) client program. IM client programs typically have a user interface that presents representations of a user's selected buddies (i.e., other users of the instant messaging program selected by the user). When a buddy's IM client program is connected to the network and the buddy is available, a user may communicate or interact with the buddy (and other users) using the instant messaging program. For example, the user may use the IM client program to engage in a real-time textual messaging session with the buddy.

At times, a user may be away from his or her computer or otherwise unavailable to engage in communications with a buddy, even though his or her IM client program is connected to the network or otherwise available for communications. In such a situation, a user typically is considered to be "away." Some IM client programs allow users to configure a preset and global "away message" that is sent as a textual message to any buddy that attempts to message the user while the user's IM client program is configured in an away mode.

Another type of communication program is the electronic mail (e-mail) client program. An e-mail client program allows a user to compose a message (which is often text, but may also include multimedia features such as sound, video, and pictures) and send that message to another e-mail user at a different computer.

Similar to IM communications, there are times when an intended e-mail recipient is unavailable for e-mail communications. For example, an e-mail user may be on vacation for an extended period of time and, consequently, unable to get to a computer to check e-mail. Particularly because of such situations, some e-mail client programs (either on their own, or in cooperation with an e-mail server) allow an e-mail user to set up auto-reply e-mails and configure the e-mail client program (or e-mail server, depending on implementation) to operate in an auto-reply mode. An auto-reply e-mail is one that is automatically sent to an e-mail user in response to receiving an e-mail from that user. By way of example, the e-mail user who is on vacation may set up an auto-reply message that includes the message "I am on vacation for the week." When the e-mail client program or server is configured to be in an auto-reply mode and another user (the sending user) sends an e-mail to the vacationing e-mail user (the intended recipient), a reply e-mail is automatically sent to the sending user with the message "I am on vacation for the week."

SUMMARY

In one aspect, users are able to set customized auto-reply messages. The user can organize one or more contacts into one or more categories. The user can set a global auto-reply message; can set category auto-reply messages for one or more of the categories; and can set personal auto-reply messages for one or more of the contacts. When an e-mail from a contact is received, at least one of the following is performed: a personal auto-reply message is sent to the contact if the user has set a personal auto-reply message for the contact; a category auto-reply message is sent to the contact if the user has set a category auto-reply message for a category including the contact; and the global auto-reply message is sent to the contact if the user has set the global auto-reply message.

In another aspect, a user can organize contacts into categories; select a category; and set a category auto-reply message for the selected category. The set category auto-reply message is sent to contacts that are organized into the selected category when an e-mail is received from the contacts that are organized into the selected category.

Implementations of this aspect may include one or more of the following features. For example, the user may be able to select a contact that is organized into the selected category; and to set a personal auto-reply message for the selected contact. The personal auto-reply message is sent to the selected contact when an e-mail is received from the selected contact. The user also may be able to set a global auto-reply message, wherein the global auto-reply message is sent to contacts that are organized into categories for which no category auto-reply message has been set and for which no personal auto-reply message has been set.

In another aspect, an e-mail client program allows a user to set customized auto-reply messages. The program has a first interface element that allows a user to organize contacts into categories and a second interface element that allows the user to set a category auto-reply message for a category. The set category auto-reply message is sent to contacts that are organized into the category for which the category auto-reply message is set when an e-mail is received from the contacts that are organized into the category for which the category auto-reply message is set.

Implementations of this aspect may include one or more of the following features. For example, the e-mail program may have another interface element that displays contacts in a manner that indicates into which category the contacts are organized. An interface element may be included to allow the user to select a contact; and another interface element may be included to allow the user to set a personal auto-reply message for the selected contact. The personal auto-reply message then is sent to the selected contact when an e-mail is received from the selected contact. The category auto-reply may be additionally sent to the selected contact when an e-mail is received from the selected contact. Alternatively, a category auto-reply message is sent to a contact only when a personal auto-reply has not been set for the contact.

The e-mail program may include an interface element that allows the user to set a global auto-reply reply message, which is sent to contacts that are organized into categories for which a category auto-reply message has not been set. The category auto-reply may be additionally sent to the selected contact when an e-mail is received from the selected contact.

Implementations of the foregoing aspects also may include one or more of the following features. For example, an interface may display representations of the categories and representations of the contacts, which may be displayed in a manner that indicates which contacts are organized into which categories.

Setting a personal auto-reply message may include setting a personal auto-reply message that will be appended as an additional message on to a category auto-reply message if the category auto-reply message has been set for the category into which the contact is organized. Alternatively, setting a personal auto-reply message may include setting a personal auto-reply message that will sent in addition to the a category auto-reply message if the category auto-reply message has been set for the category into which the contact is organized. Alternatively, setting a personal auto-reply message comprises setting a personal auto-reply message for a contact that will be sent in place of the category auto-reply message associated with the category into which the contact is organized.

Similarly, setting a category auto-reply message may include setting a category auto-reply message that will be appended as an additional message on to the global auto-reply message. Alternatively, setting a category auto-reply message comprises setting a category auto-reply message that will be sent in addition to the global auto-reply message. Alternatively, setting a category auto-reply message comprises setting a category auto-reply message that will be sent in place of the global auto-reply message.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In general, an interface is provided to the user of an instant messaging client program. The interface displays the user's buddies in a manner that identifies one or more buddy groups, and the membership of buddies within one or more of those buddy groups. The user may use the interface to set customized away messages on a buddy group basis, or otherwise.

Similarly, an interface is provided to the user of an e-mail client program. The interface allows the user to organize his or her contacts into categories and may display representations of the user's e-mail contacts in a manner that indicates to which category the contacts belong. The user may use the interface to set customized auto-reply messages on a per-category basis, or otherwise.

Figure 1:
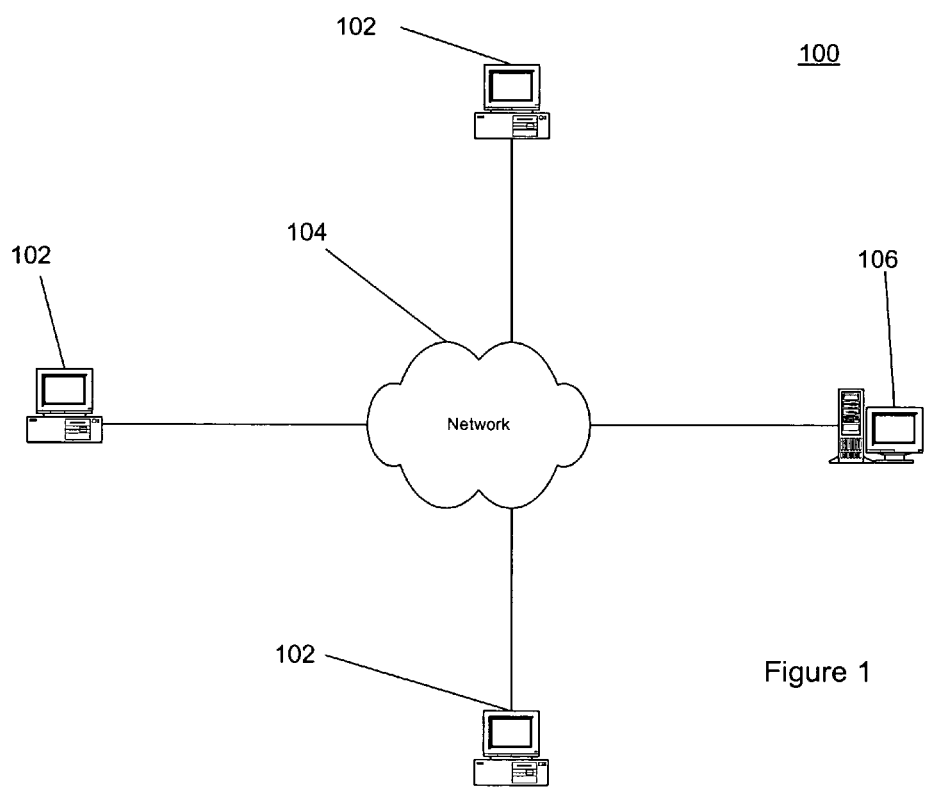
FIG. 1 is a diagram of an exemplary networked computing environment that may support instant messaging communications.

FIG. 1 illustrates an exemplary networked computing environment 100 that may support instant messaging and e-mail communications. Computer users are distributed geographically and communicate using client systems 102. A network 104 interconnects client systems 102. Client systems 102 are connected to network 104 through various communication mediums, such as a modem connected to a telephone line (using, for example, serial line internet protocol (SLIP) or point-to-point protocol (PPP)) or a direct Internet connection (using, for example, transmission control protocol/internet protocol (TCP/IP)). A host server 106 also may be connected to network 104 and may be used to facilitate some direct or indirect communications between the client systems 102.

Each of the client systems 102 and host server 106 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 102 and host server 106 may receive instructions from, for example, a software application, a program, a piece of code, a device, a computer, a computer system, or a combination thereof, which independently or collectively direct operations. These instructions may take the form of one or more communications programs that facilitate communications between the users of client systems 102. Such communications programs may include, for example, electronic mail (e-mail) programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 102 or the host server 106.

Each client system 102 and host server 106 includes a communications interface (not shown) used by the communications programs to send communications through network 104. The communications may include e-mail, audio data, video data, general binary data, or text data (e.g., data encoded in American Standard Code for Information Interchange (ASCII) format).

Examples of the network 104 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. The network 104 may include multiple networks or sub-networks, each of which may include, for example, a wired or wireless data pathway.

Instant messaging client programs (executing on clients 102, for example) may use an instant messaging server to assist in communications between users. The instant messaging server may be implemented, for example, using host server 106. When a user is connected to the network 104 and executes the instant messaging client program, the instant messaging client program contacts the host server 106 and logs the user onto the host server 106. The host server 106 may inform the instant messaging client program when the program user's buddies are online and may facilitate communications between the program user and a buddy. Thus, once logged on to the host server 106, a user may use the IM client program to view whether particular buddies are online, to exchange IMs with particular buddies, to participate in group chat rooms, or to trade files such as pictures, invitations or documents. The program user also may be able to find other buddies with similar interests, get customized information such as news and stock quotes, and search the World Wide Web.

The host server 106 may support IM services irrespective of a program user's network or Internet access. Thus, host server 106 may allow users to send and receive IMs, regardless of whether they have access to any particular Internet service provider (ISP). The host server 106 also may support associated services, such as administrative matters, advertising, directory services, chat, and interest groups related to IM. To transfer data, the host server 106 employs one or more standard or proprietary IM protocols.

Host server 106 may assist IM communications between users of IM client programs by facilitating the establishment of a peer-to-peer communication session between the IM client programs. Or the host server 106 may assist IM communications by directly routing communications between the IM client programs.

Similarly, e-mail client programs (executing on clients 102, for example) use an e-mail server, implemented, for example, using host server 106. An e-mail user, such as a user of one of the client systems 102, typically has one or more e-mail mailboxes on an e-mail system, which may incorporate e-mail server 106. Each mailbox corresponds to an e-mail address. E-mail sent to one of the e-mail user's e-mail addresses is routed to e-mail server 106 and placed in the mailbox that corresponds to the e-mail address to which the e-mail was sent. The e-mail user then uses an e-mail program or interface, for example, an e-mail client program executing on a client system 102, to retrieve the e-mail from e-mail server 106 and view the e-mail.

The e-mail client program executing on a client system 102 also may allow the user to send e-mail to an e-mail address. When the sender indicates the e-mail is to be sent to the recipient address, the e-mail client program executing on a client system 102 communicates with e-mail server 106 to handle the sending of the e-mail to the recipient address. E-mail server 106 receives the e-mail and forwards the e-mail to the e-mail server that handles the e-mail for the recipient address. The e-mail server that handles e-mail for the recipient address may be the same e-mail server 106 or a different server. The user to whom the recipient address corresponds may then use an e-mail client program retrieve the e-mail from the corresponding e-mail server, as described above.

Figure 2A:
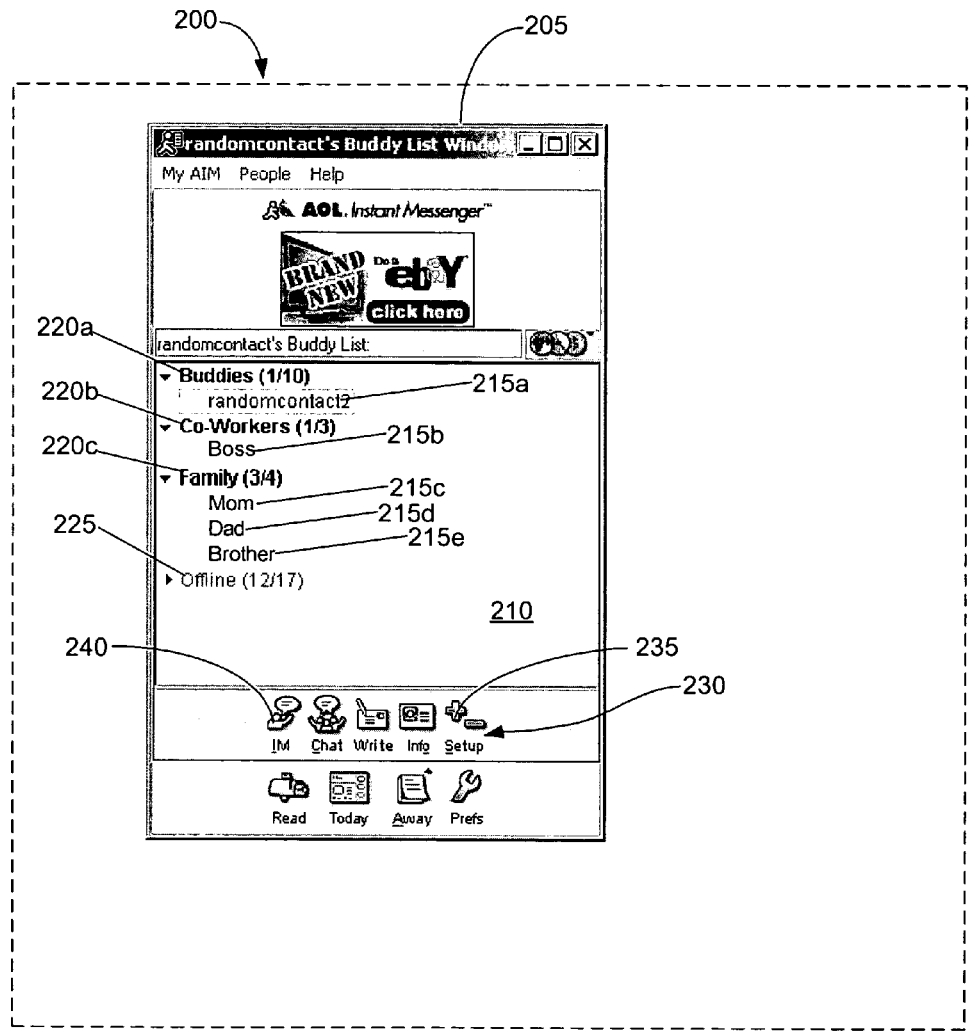
FIG. 2A is an illustration showing an exemplary interface presented to a user when an instant messaging client program is running on one of the client systems of FIG. 1.

FIG. 2A illustrates an exemplary interface presented to a user (e.g., randomcontact) when an instant messaging client program is running on one of the client systems 102. Instant messaging programs typically allow users to communicate in real-time with each other in a variety of ways. For example, many instant messaging programs allow users to send text as an instant message, to transfer files, and to communicate by voice. Examples of IM programs include AIM (America Online Instant Messenger), AOL (America Online) Instant Messaging, Yahoo Messenger, MSN Messenger, and ICQ.

Shown is a desktop 200 with a user interface 205 of the instant messaging client program. User interface 205 has a box 210 that displays representations 215a-215e of the program user's buddies. In the interface 205, the representations 215a-215e are icons showing the screennames of the buddies, however, other types or forms of representations may be used. The representations 215a-215e may provide contextual information to the program user about the buddy, such as whether the buddy is online, how long the buddy has been online, whether the buddy is away, or whether the buddy is using a mobile device.

The list of buddies displayed in box 210 of user interface 205 typically is referred to as the buddy list. In the buddy list, buddies are grouped together into buddy groups. The name or representation of each buddy group is displayed in the buddy list. When a buddy's IM client program is able to receive communications, the representation of the buddy in the buddy list is displayed or visually modified under the name or representation of the buddy group that includes the buddy. For example, in the interface shown by FIG. 2A, the buddy whose screenname is "randomcontact2" is part of the Buddies buddy group and, consequently, the representation 215a for randomcontact2 is listed under the representation 220a for the Buddies buddy group. Likewise, the buddy whose screenname is "Boss" is part of the Co-Workers buddy group and, consequently, the representation 215b for Boss is listed under the representation 220b for the Co-Workers buddy group. Similarly, the buddies whose screennames are "Mom," "Dad," and "Brother" are part of the Family buddy group 220c and, consequently, their representations 215c-215e are listed under the representation 220c for the Family buddy group.

When a buddy is not online, the representation of the buddy is listed under the representation 225 for the Offline buddy group. When a buddy's IM client program is first able to receive communications, the representation of the buddy may be visually modified and moved from the Offline buddy group to the buddy group that includes the buddy. Similarly, when the buddy's IM client program first becomes unable to receive communications, the representation of the buddy may be visually modified and moved from the buddy group to the Offline buddy group.

Figure 2B:
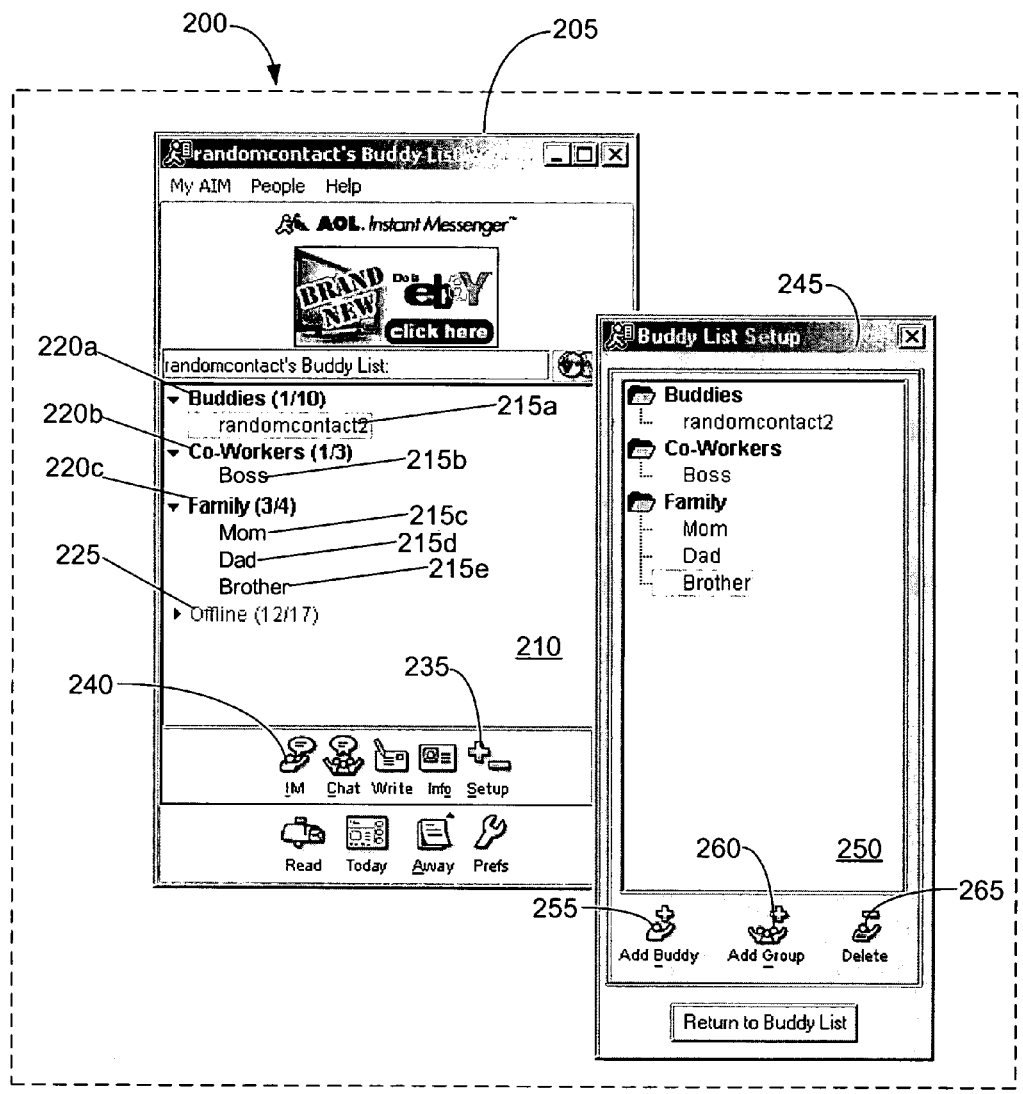
FIG. 2B is an illustration showing a window that may be used to configure a buddy list of an instant messaging client program.

Referring to FIG. 2B, the user may configure the buddy list by adding, deleting, or renaming buddy groups and by changing the relationship of one or more buddies with respect to a group (e.g., by adding buddies to or deleting buddies from each buddy group, or by making one group relate to another group). Shown in FIG. 2B is a window 245 that may be invoked for configuring the buddy list. Window 245 includes a list box 250, which contains a list of buddy groups and screennames that corresponds to the buddy list displayed in user interface 205, absent the offline buddy group. As the user makes changes to the list in the window 245, those changes are reflected in the buddy list displayed in interface 205.

To allow a user to make changes to the list in list box 250, window 245 includes an Add Buddy button 255, an Add Group button 260, and a Delete button 265. Other buttons or interfaces may be used for configuring the buddy list. To add a buddy group, the user selects the Add Group button 260 and enters the name of the new buddy group, which is added to list box 250. To add a buddy to a buddy group, the user selects the buddy group, selects the Add Buddy button 255, and enters the screenname or other identifier of the buddy. The buddy is then listed under the selected buddy group. For instance, to create the Family buddy group 220c, the user selected the Add Group button 260 in window 245 and entered "Family." This buddy group was then added to the list in list box 250 and, consequently, added to the buddy list displayed in interface 205. To add the group members (Mom, Dad, and Brother), the user selected the Family buddy group listed in list box 250, selected the Add Buddy button 255, and entered in the screenname of one the group members. This was repeated until all group members were added. To remove buddies or groups, the user selects the buddy or group and then selects the Delete button 265. A buddy may occupy more than one buddy group.

Referring again to FIG. 2A, user interface 205 may have icons 230 to help a user set various options or perform operations in the instant messaging program. By selecting the "setup" icon 235, for example, the program user can invoke window 245 for configuring the buddy list.

When a buddy is online, the program user may use the instant messaging client program to communicate or interact with the buddy in a number of ways. For instance, the program user can send an instant message to the buddy (typically in the form of text). To send instant messages, a program user initiates an instant message session with a buddy. A program user may initiate the instant message session, for example, by double-clicking on a buddy's representation 215 or by first selecting a buddy and then selecting an "IM" icon 240. Starting a session may invoke a window in which messages can be typed back-and-forth between the program user and the buddy.

Figure 2C:
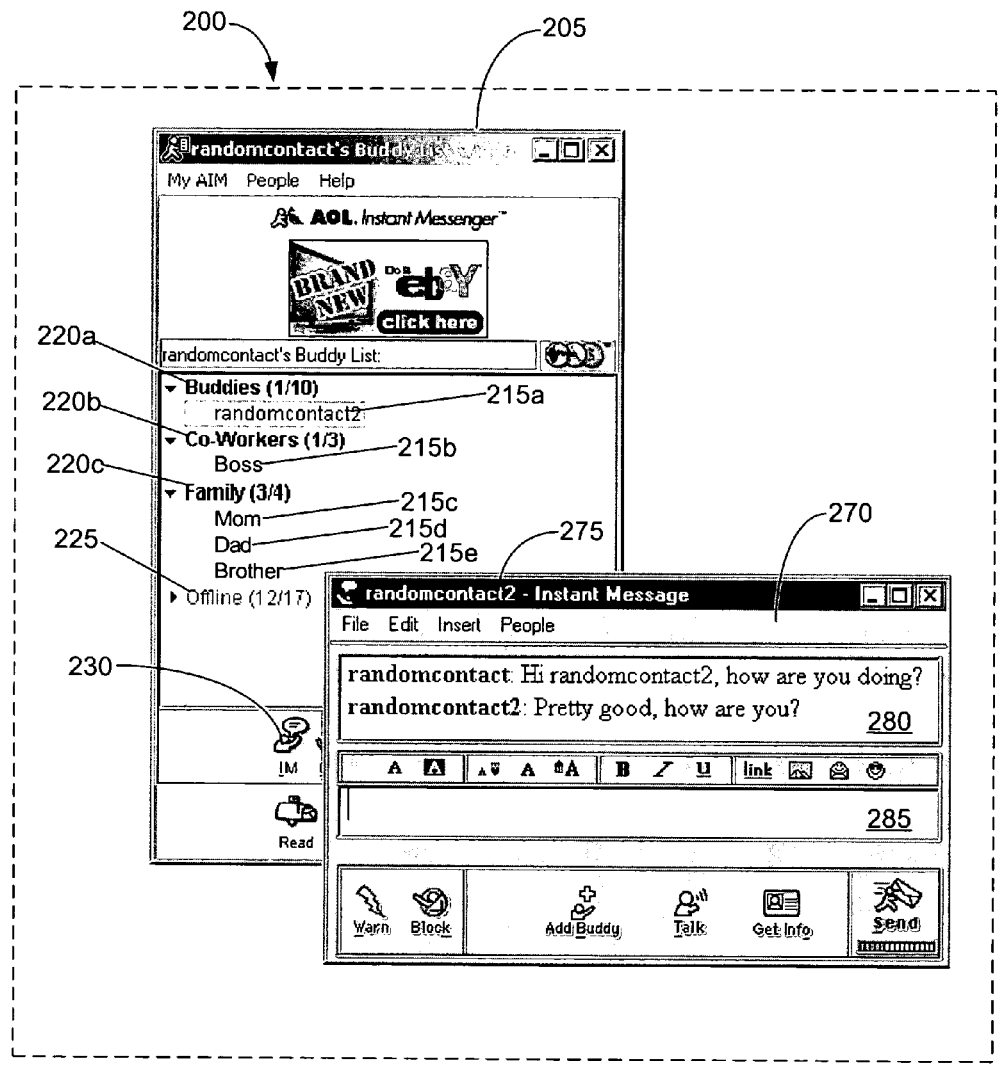
FIG. 2C is an illustration showing an exemplary instant messaging window presented when a user is engaged in a textual instant message session with a buddy.

FIG. 2C illustrates an exemplary instant messaging window 270 presented when a user is engaged in a textual instant message session with a buddy. The window 270 includes a titlebar 275, in which the buddy's screenname (e.g., "randomcontact2") is shown. Window 270 includes a text box 280 and an edit box 285. A similar window is displayed on the buddy's client system.

The sent and received messages of the user and buddy are displayed in text box 280. The sender's (i.e., user's or buddy's) screenname may be listed beside the sender's corresponding message in text box 280. For instance, in the exemplary window shown, the user (whose screen name is "randomcontact") has typed and sent the message "Hi randomcontact2, how are you doing?" to the buddy (whose screenname is "randomcontact2"). The buddy has replied with the message "Pretty good, how are you?". To send a message, the user types the message in edit box 285 and activates a send command, for example, by pressing an ENTER key. In response, the entered text is displayed in text box 280 and in the textbox of the similar window displayed on the buddy's client system.

As described above, a user may be away from his or her computer or otherwise unavailable to engage in communications with a buddy, even though his or her instant messaging program is connected to the network or otherwise available for communications. In such a situation, a user typically is considered to be "away." The instant messaging client program may be placed in an away mode, in which the user is considered away (i.e., unavailable to engage in communications with a buddy). When the instant messaging client program is in an away mode, the client program automatically sends an away message to a buddy that attempts to communicate with the user through the instant messaging client program. The away message that is sent may be set or input by the user.

The instant messaging client program may be explicitly placed into an away mode by the user. For example, the instant messaging client program may have an "Away" menu item that the user can select to place the instant messaging client program into an away mode. The instant messaging program also may enter an away mode automatically in response to various factors. For example, the instant messaging client program may enter an away mode automatically when there has not been any input to the client system for a predetermined period of time.

Further, a user also may be considered "away" when the instant messaging client program is not logged onto host server 106 and away messaging may be handled, for example, by host server 106. In this case, an away mode is entered (by host server 106) when the instant messaging client program logs off of host server 106.

In general, host server 106 may be used to handle away messaging, rather than the instant messaging client program. That is, the instant messaging client program acts as the interface for the user to set up away messaging, but away messages are sent to buddies by host server 106, rather than by the instant messaging client program.

Figure 3:
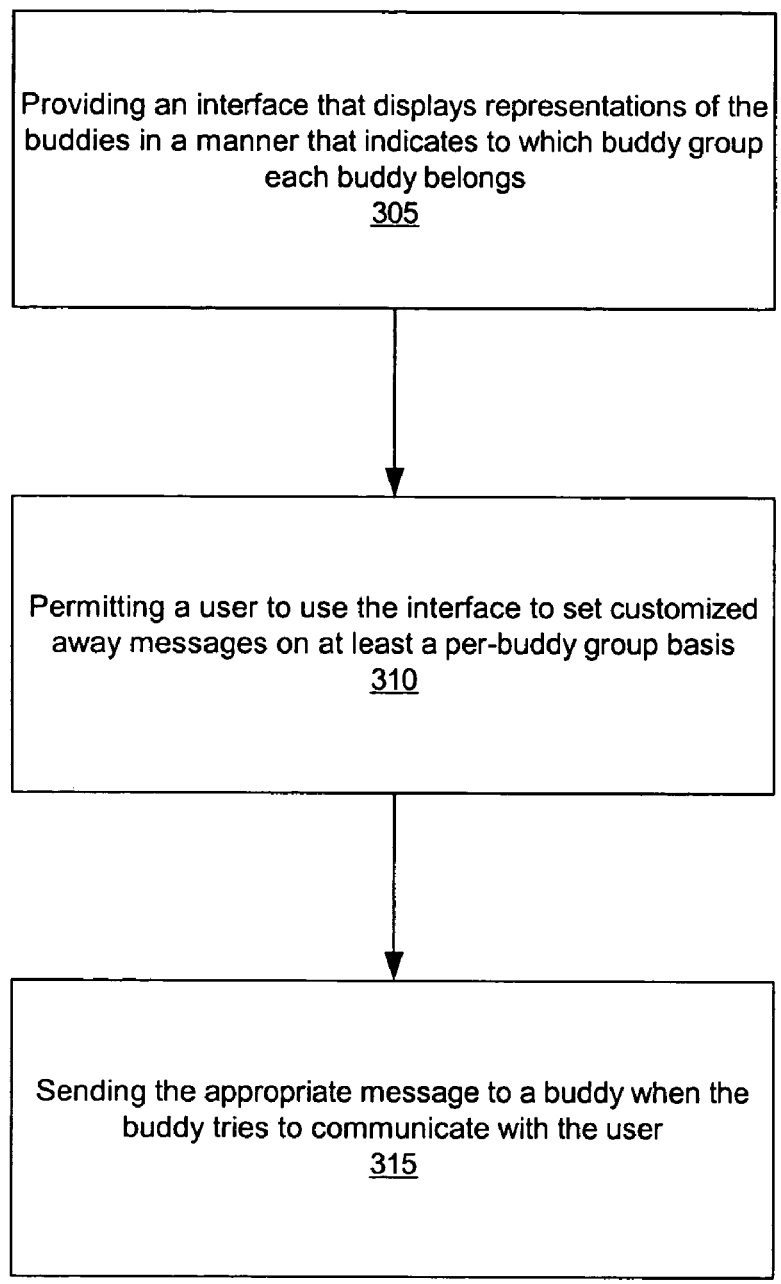
FIG. 3 is a flow chart illustrating a method for providing customized away messages to buddies that attempt to communicate with the user through an instant messaging client program while the user is away.

FIG. 3 is a flow chart illustrating a method 300 for providing customized away messages to buddies that attempt to communicate with the user through the instant messaging client program while the user is away. An interface is provided to the user (305). The interface displays representations of the user's buddies in a manner that identifies one or more buddy groups, and the membership of buddies within one or more of those buddy groups. For example, the interface may display the buddies in the same manner as interface 205, with the screennames of the buddies displayed underneath the name of the buddy groups that include the buddies. Other ways of displaying the buddies that identifies one or more buddy groups, and the membership of buddies within one or more of those buddy groups may be used. The interface may be a graphical user interface (GUI) and may be composed of one or more windows in a windowing-based graphical environment (e.g., Microsoft Windows, Macintosh, X Windows).

The user may use the interface provided to set customized away messages on a buddy group basis (310). To set a customized away message for a buddy-group, the user may use the interface to select the buddy group and enter in an away message that will be used for all buddies that belong to the selected buddy group. In other implementations, in addition to setting away messages on a group basis, the user may be able to use the interface to set a global away message and/or personal away messages on a per-buddy basis. A global away message is a default away message sent to a buddy if no other type of away message (e.g., buddy group away message or personal away message) is set for the buddy. A personal away message is a message that is set for a particular buddy and only used for that buddy.

In some implementations that allow for global away messages, the group away messages set for a buddy group may be set by overriding the global away message with a new message or by appending an additional message to the global away message. For example, if the global away message is set to "I am away.", then a buddy group message may be set by appending "I will be back in an hour." to the global away message. In this case, the away message set for buddies in the selected buddy group would be "I am away. I will be back in an hour." If the buddy group message was set by replacing the global away message, the away message set for buddies in the selected buddy group would be "I will be back in an hour." Similarly, in some implementations that allow for personal away messages, the personal away messages may be set by appending a new message to the group away message (or global away message, if implemented, and no group away message exists) or by overriding a group away message or a global away message for particular buddies.

Appending may be implemented by concatenating each new message to the higher level message and storing the resulting message as the personal or group away message. Following the example above, in this case the message "I will be back in an hour." is concatenated to the message "I am away." when the user chooses to append. The resulting message then is stored as the group away message, which is sent to buddies in the group while the user is away.

Alternatively, appending may be implemented by storing each message separately and concatenating each of the messages just prior to sending the away message to a buddy. Following the example above, in this case the message "I am away." is stored as the global away message and the message "I will be back in an hour." is stored separately as the group away message, along with an indicator that the group away message is to be appended to the global away message. The group away message is concatenated to the global away message just prior to sending the away message to a buddy in the buddy group. The message resulting from the concatenation then is sent to the buddy.

Default global away messages, default group away messages, or default personal away messages, may be provided, depending on the implementation. For example, if the Buddies buddy group is provided as a default upon installation of the instant messaging client program, a default group away message also may be provided for the Buddies buddy group. As another example, a default global message may be provided when the instant messaging client program is installed so that an away message always exists for the buddies, regardless of whether a user has personalized any away messages, group or personal. Similarly, a default group message may be provided for any default buddy groups and newly created buddy groups, whether or not a global message is provided. This enables an away message to always exist for buddies even when no global away message exists, regardless of whether a user has set a group away message (or personal away message, if implemented also).

When a buddy tries to communicate with the intended recipient user through the instant messaging client program while the user is away or offline, the appropriate away message is sent (315). For example, in an implementation which supports global away messages, group away messages, and personal away messages, a personal away message is sent to the buddy if, set; otherwise, or additionally, a group away message is sent, if set; otherwise, or additionally, a global away message is sent, if set. As another example, in an implementation that supports global away messages and group away messages, the group away message for the group that includes the buddy is sent, if set; otherwise, or additionally, the global away message is sent, if set. In an implementation that only supports group away messages, the group away message for the group that includes the buddy is sent to the buddy, if set.

Figure 4A:
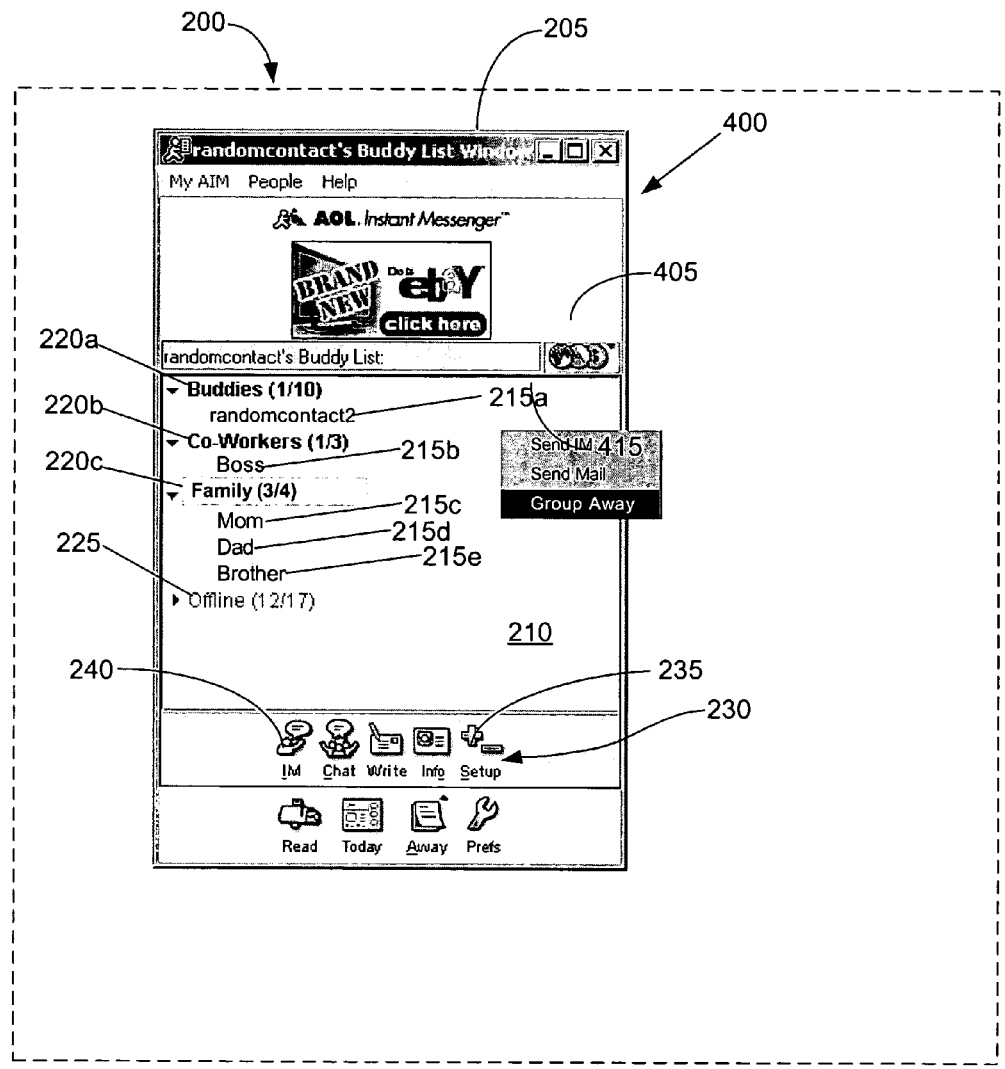
FIGS. 4A and 4B are illustrations showing an interface that permits a user to set customized messages on a per-group basis.
Figure 4B:
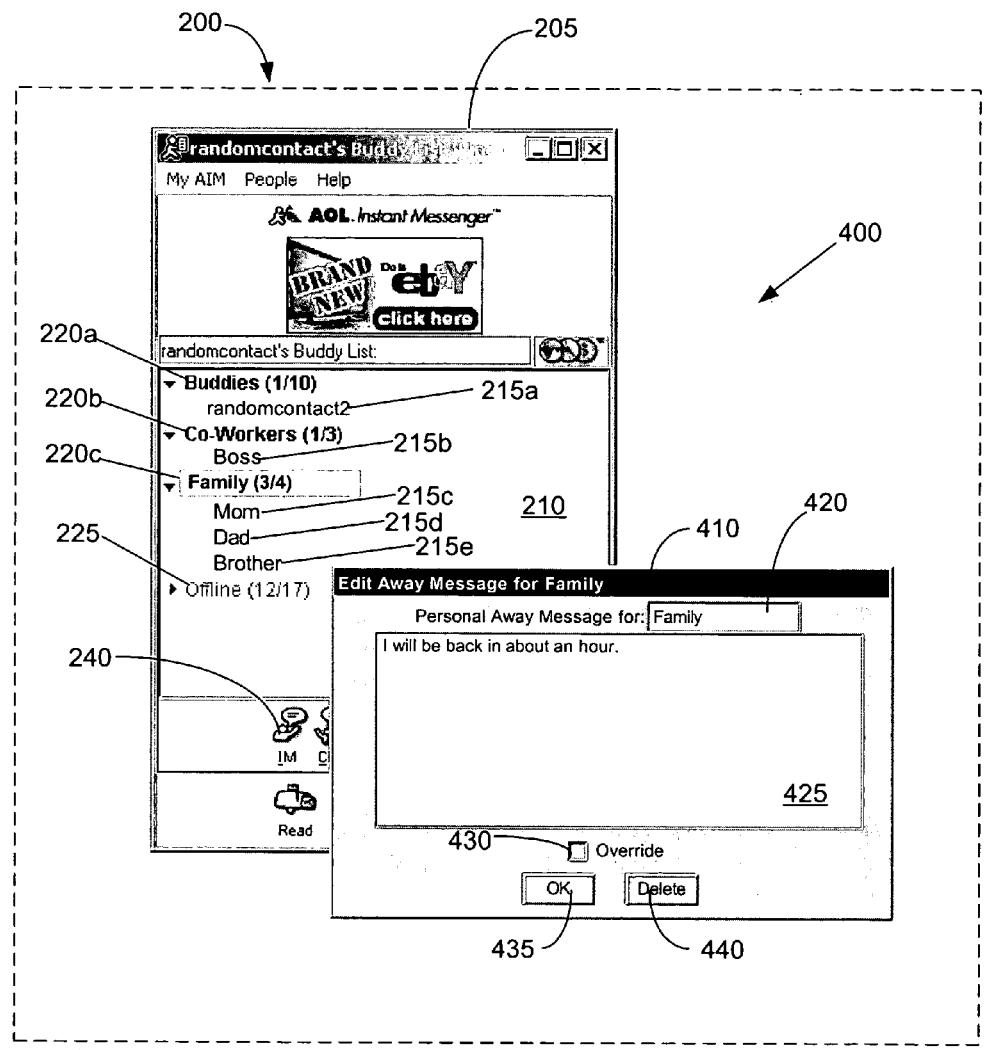

FIGS. 4A and 4B illustrate an interface 400 that permits a user to set customized messages on a per-buddy group basis. The interface 400 includes the instant messaging client program interface 205, a context menu 405 (shown in FIG. 4A), and a dialog box 410 (shown in FIG. 4B). Context menu 405 may be invoked by using a mouse to select a buddy group, for example the Family buddy group 220c, and clicking a button on the mouse. Context menu 405 provides several options for actions that can be performed. A Group Away option 415 allows the user to set a group away message for the buddy group selected.

Selecting the Group Away option 415 invokes dialog box 410. Dialog box 410 includes a text box 420 that contains the name of the buddy group for which the group away message is being set (e.g., Family), and which allows for entry/selection of other groups for which group away messages are desired. Dialog box 410 also includes an edit box 425 into which the user may enter text for the group away message. A checkbox 430 may be used to indicate whether the text entered into the edit box 425 for the group away message is being appended to a global away message or if the text is replacing the global away message. When checkbox 430 is checked, the text entered into the edit box 425 replaces the global away message, while the text is appended to the global away message when the checkbox 430 is not checked.

An OK button 435 is used to set the group away message using the text entered into edit box 425. Thus, when checkbox 430 is checked and the OK button 435 is selected, the group away message is set to just the text entered into the edit box 425. When the checkbox 430 is unchecked and the OK button 435 is selected, the group away message is set to the global away message with the text entered into the edit box 425 appended thereto.

Selecting a Delete button 440 deletes any entered text from edit text box 420 and removes the group away message.

Figure 5A:
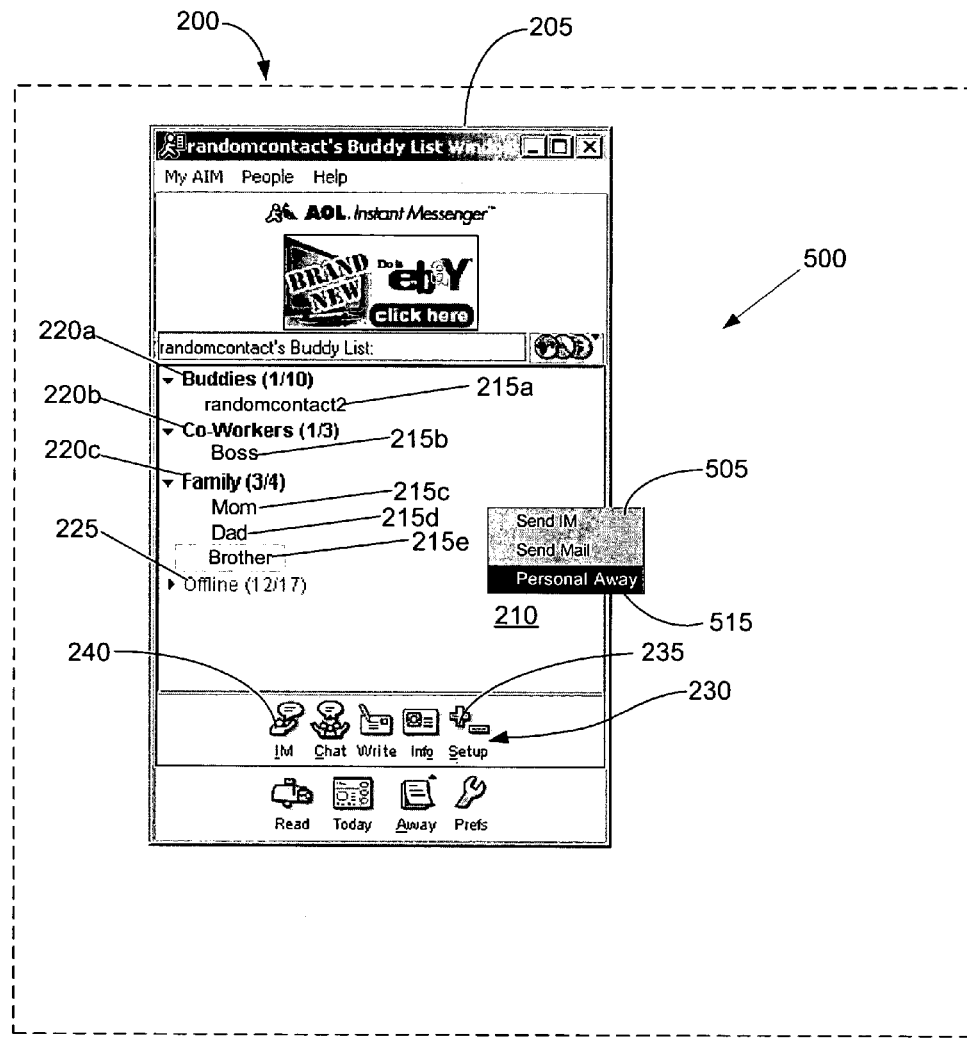
FIGS. 5A-5C are illustrations showing an interface that may be used for allowing a user to customize on a per buddy basis.
Figure 5B:
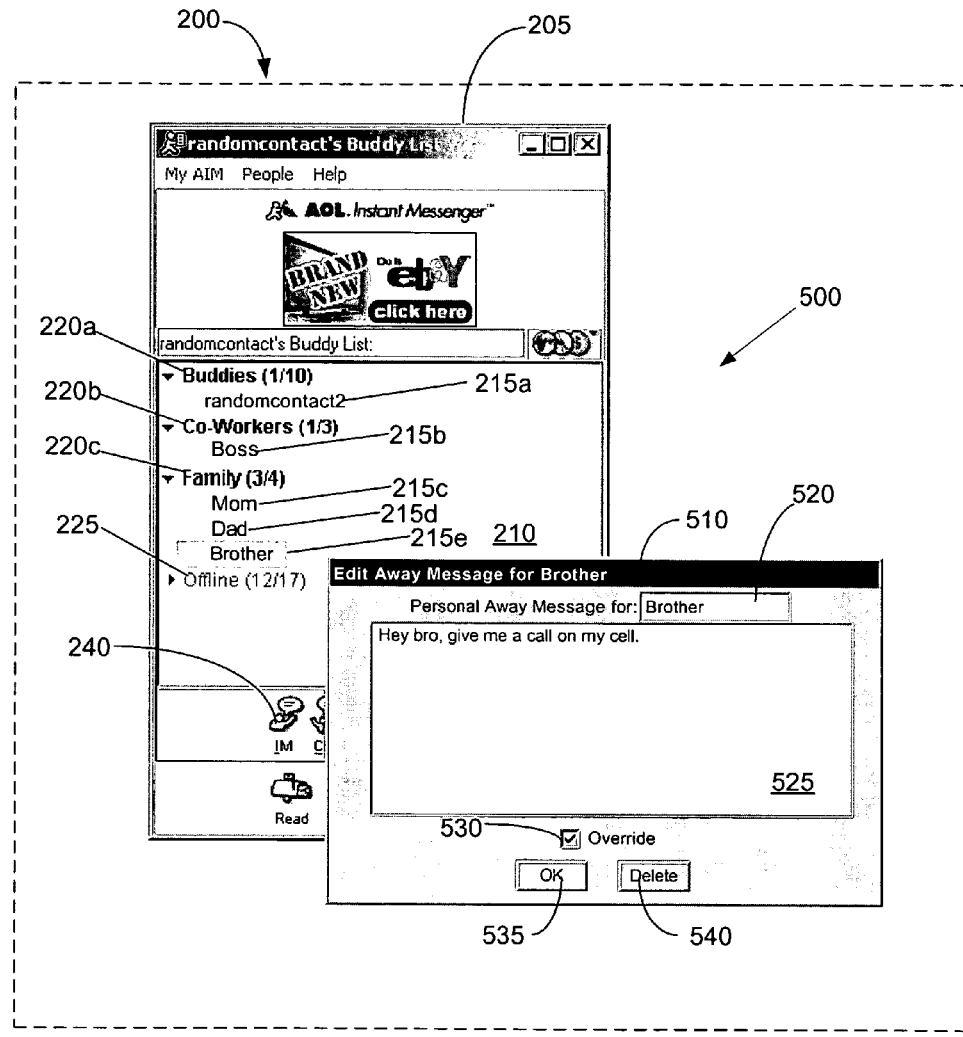

FIGS. 5A and 5B show an interface 500 that may be used for further allowing the user to customize on a per buddy basis. The interface 500 is similar to interface 400 and includes the instant messenger client program interface 205, a context menu 505 (shown in FIG. 5A), and a dialog box 510 (shown in FIG. 5B). Context menu 505 may be invoked by using a mouse to select a buddy, for example Brother 215e, and clicking a button on the mouse. Context menu 505 provides several options for actions that can be performed. A Personal Away option 515 allows the user to set a personal away message for the buddy selected.

Selecting the Personal Away option 515 invokes dialog box 510. Dialog box 510 includes a text box 520 that contains the name of the buddy for which the personal away message is being set (e.g., Brother). Dialog box 510 also includes an edit box 525 into which the user may enter text for the personal away message. A checkbox 530 may be used to indicate whether the text entered into the edit box 525 for the personal away message is being appended to the global or group away message (if one is set) or if the text is replacing the global or group away message (if one is set). When checkbox 530 is checked, the text entered into the edit box 525 replaces the global or group away message, while the text is appended to the global or group away message when the checkbox 530 is not checked.

An OK button 535 is used to set the personal away message using the text entered into edit box 525. Thus, when checkbox 530 is checked and the OK button 535 is selected, the personal away message is set to just the text entered into the edit box 525. When the checkbox 530 is unchecked and the OK button 535 is selected, the personal away message is set to the global or group away message with the text entered into the edit box 525 appended thereto.

Selecting a Delete button 540 deletes any entered text from edit box 520 and removes the personal away message.

When implementing the instant messaging program to allow customized messages on a per-buddy group and per-buddy basis, the context menus 405 and 505 may be implemented as a single context menu and the dialog boxes 410 and 510 may be implemented as a single dialog box. The single context menu may be invoked when either a buddy group or buddy is selected and may have a single option (e.g., a personalize away message option) for invoking the single dialog box. The single dialog box may then be used to set the away message for the buddy or buddy group selected, overriding or appending to the group away message (or global away message if no group away is set) when a buddy is selected or the global away message when a buddy group is selected.

The text box that contains the name of the buddy or buddy group may be an edit box such that the user can edit the name, with the changes applied to the buddy or buddy group entered. In such an implementation, for instance, if a user originally invokes the dialog box for the Family buddy group, the edit box contains the name "Family." After the user has entered and set the group away message for Family, the user can then delete "Family" from the edit box and enter "Brother." After entering "Brother," the user then may use the dialog box to enter and set a personal away message for Brother, without having to go back to the context menu to invoke the dialog box.

Figure 5C:
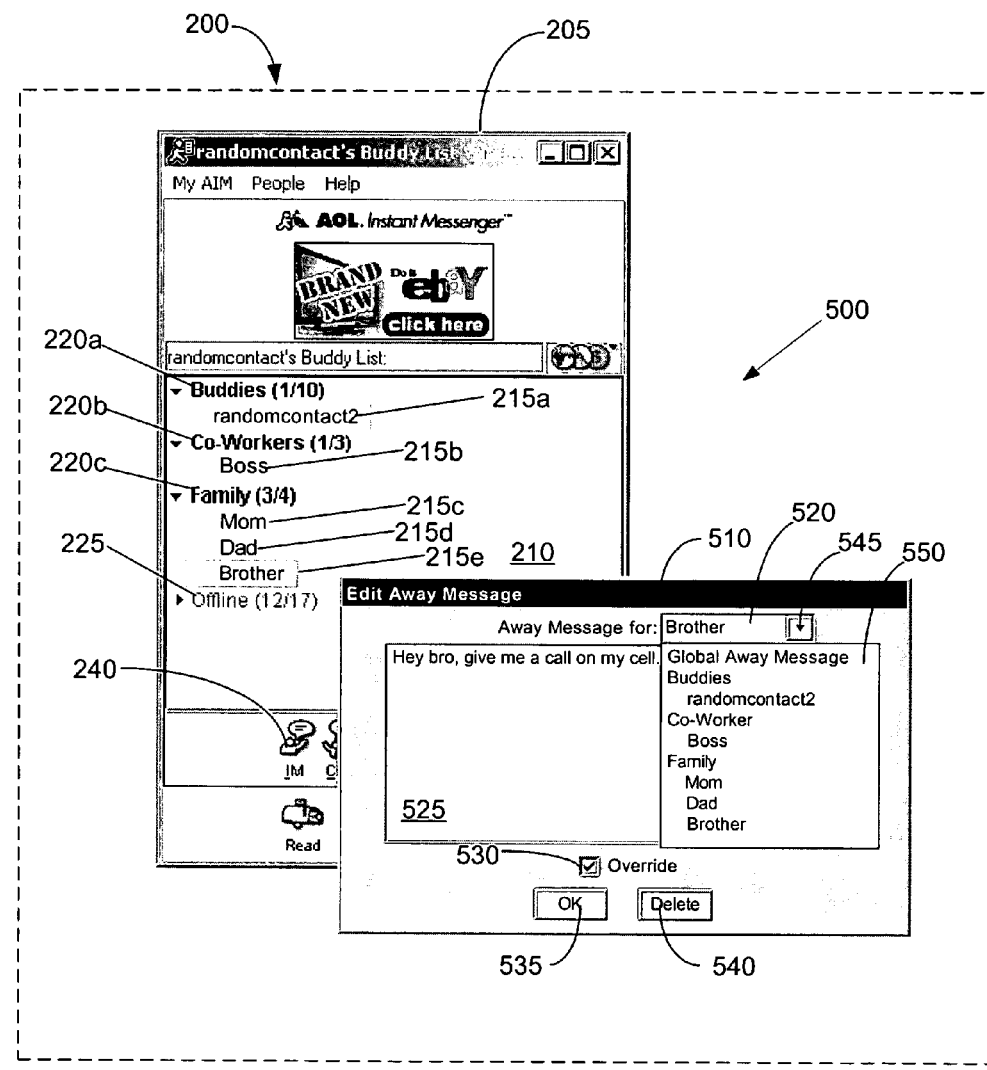

FIG. 5C illustrates another exemplary dialog box 510 in which box 520 is a combo-box instead of a text box. Dialog box 510 is used to set the global message, group messages, and personal messages. Selecting a drop-down button 545 on combo box 520 causes a pull-down list 550 to be displayed. Pull-down list 550 is populated with the buddy groups and buddies from the buddy list, in addition to an option for the global away message. To set a message, the user selects the global away message, the buddy group, or the buddy from the populated list, types the message into edit box 525, and selects OK button 535. In this way, the user can easily select the buddy group or buddy for which a message is to be set, without having to type the name of the buddy group or buddy.

Dialog boxes 410 and 510 may be designed to show the messages (i.e., group away message or global away message) that the new message is to replace or be appended. Also, the display of checkboxes 430 and 530 in dialog boxes 410 and 510 may be conditioned on the actual existence of the message(s) to be replaced or appended. For example, if a global message does not exist, checkbox 430 may not be visible.

FIGS. 6A-6D show an instant messaging window 670 displaying exemplary away messages presented to buddies attempting to communicate with the user. As with window 270, window 670 includes a titlebar 675, in which the buddy's screenname ("randomcontact") is shown. Window 670 also includes a text box 680, in which sent and received messages appear, and an edit box 685, in which messages are entered.

In the examples shown, randomcontact has configured the away messages such that the global away message for all buddies is "I am away from my computer right now." For the Co-Workers group, the group away message has been set by appending "If you need me, give me a call on my cell at (555) 555-5555." to the global away message. As a result, the group away message for the Co-Workers buddy group is "I am away from my computer right now. If you need me, give me a call on my cell at (555) 555-5555." For the Family group, the group away message has been set by appending "I will be back in about an hour." to the global away message. As a result, the group away message for the Family buddy group is "I am away from my computer right now. I will be back in about an hour." A personal away message has been set for the buddy Brother by overriding the Family group away message and replacing the Family group away message with "Hey Bro, give me a call on my cell."

Figure 6A:
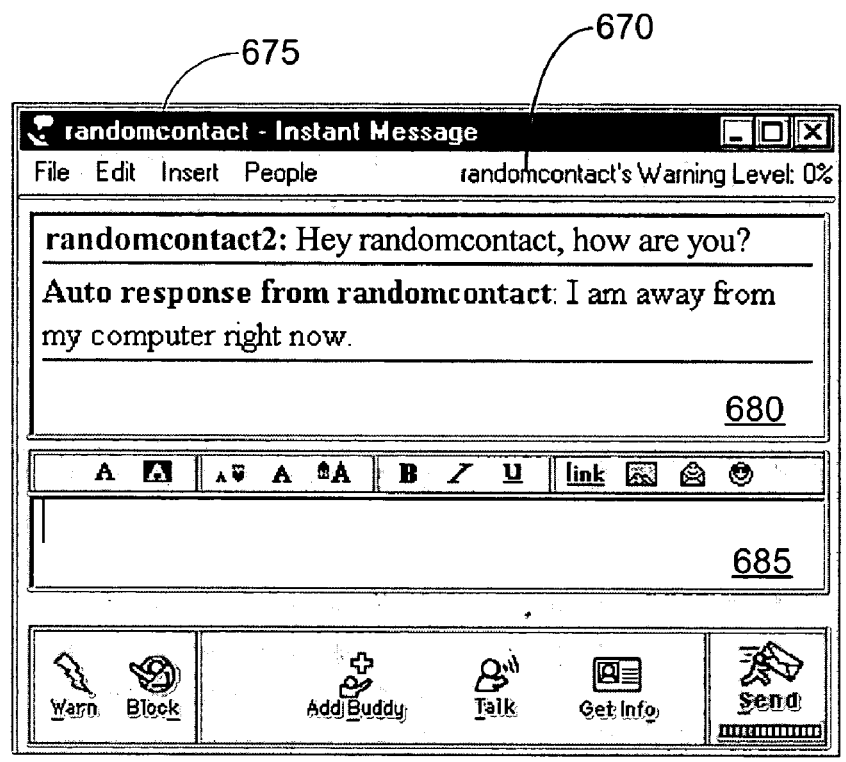
FIGS. 6A-6D are illustrations showing an instant messaging window displaying exemplary away messages that are customized.

FIG. 6A shows the response when randomcontact2 attempts to communicate with randomcontact. Randomcontact2 sent an instant message to randomcontact saying "Hey randomcontact, how are you?". Because randomcontact has not set a group away message for the Buddies buddy group and has not set a personal away message for randomcontact2, randomcontact2 receives an auto-response with the global away message, "I am away from my computer right now."

Figure 6B:
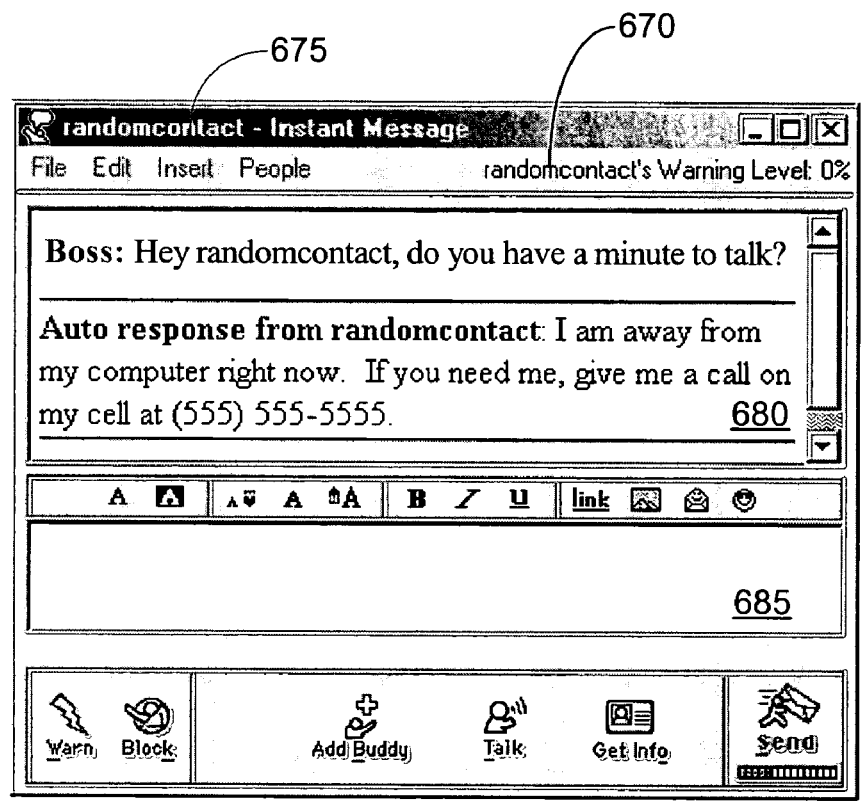

FIG. 6B shows the response when Boss attempts to communicate with randomcontact. Boss sent an instant message to randomcontact saying, "Hey randomcontact, do you have a minute to talk?". Because randomcontact has set a group away message for the Co-Workers group (the group that includes Boss), but has not set a personal away message for Boss, Boss receives an auto-response with the Co-Worker group default message, "I am away from my computer right now. If you need me, give me a call on my cell at (555) 555-5555."

Figure 6C:
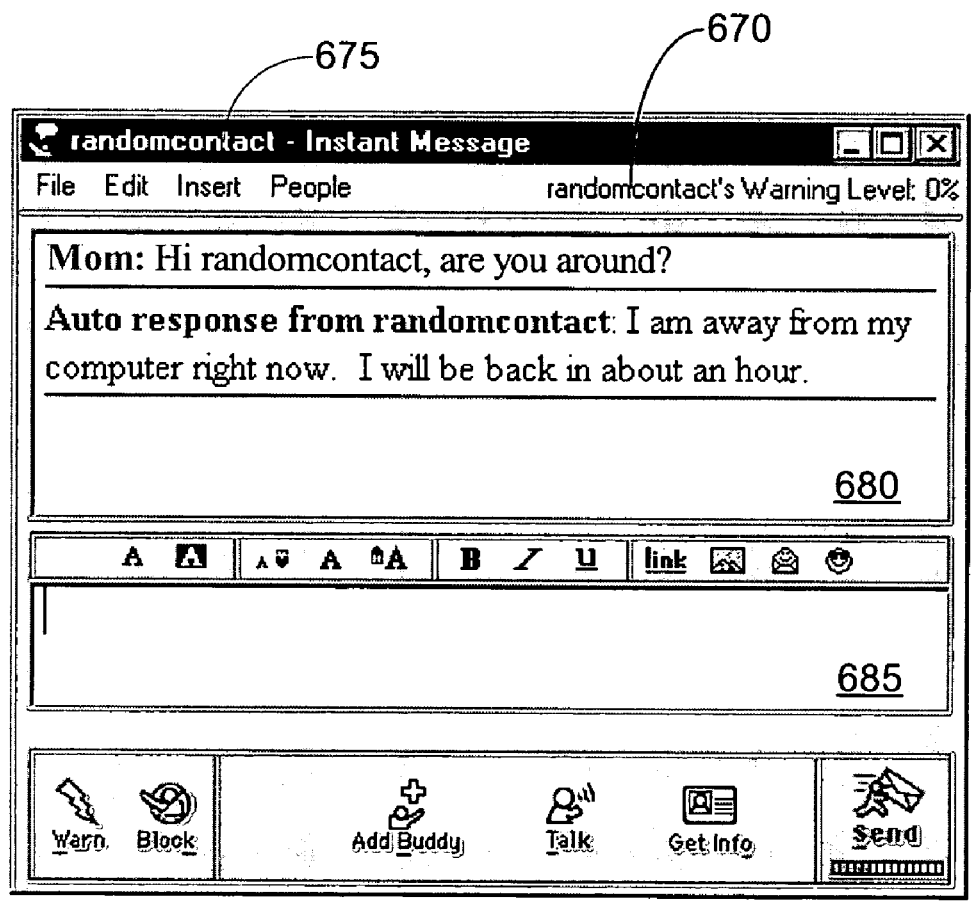

FIG. 6C shows the response when Mom attempts to communicate with randomcontact. Mom sent an instant message to randomcontact saying "Hi randomcontact, are you around?". Because randomcontact has set a group away message for the Family group (the group that includes Mom), but has not set a personal away message for Mom, Mom receives an auto-response with the Family group default message, "I am away from my computer right now. I will be back in an hour."

Figure 6D:
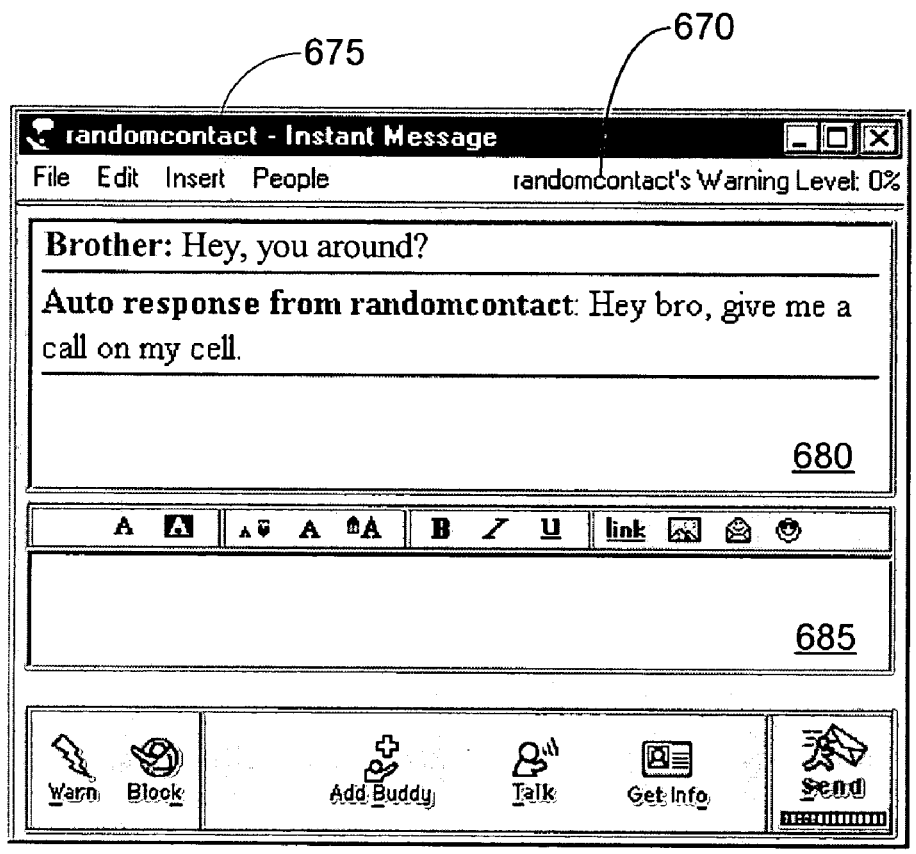

FIG. 6D shows the response when Brother attempts to communicate with randomcontact. Brother sent an instant message to randomcontact saying "Hey, you around?". As described above, randomcontact has set a personal away message for Brother by overriding the Family group message. Therefore, even though randomcontact has set a group default away message for the Family buddy group, Brother receives an auto response with the personal away message, "Hey bro, give me a call on my cell."

While the techniques have been described primarily with IM applications, they may be applied to other communications programs such as e-mail programs. For example, contacts in an e-mail program may be grouped into categories (e.g., family, friends, or co-workers) and auto-replies (i.e., automatic replies to an e-mail received from the contact) may be set on a per-category or per-contact basis.

Figure 7:
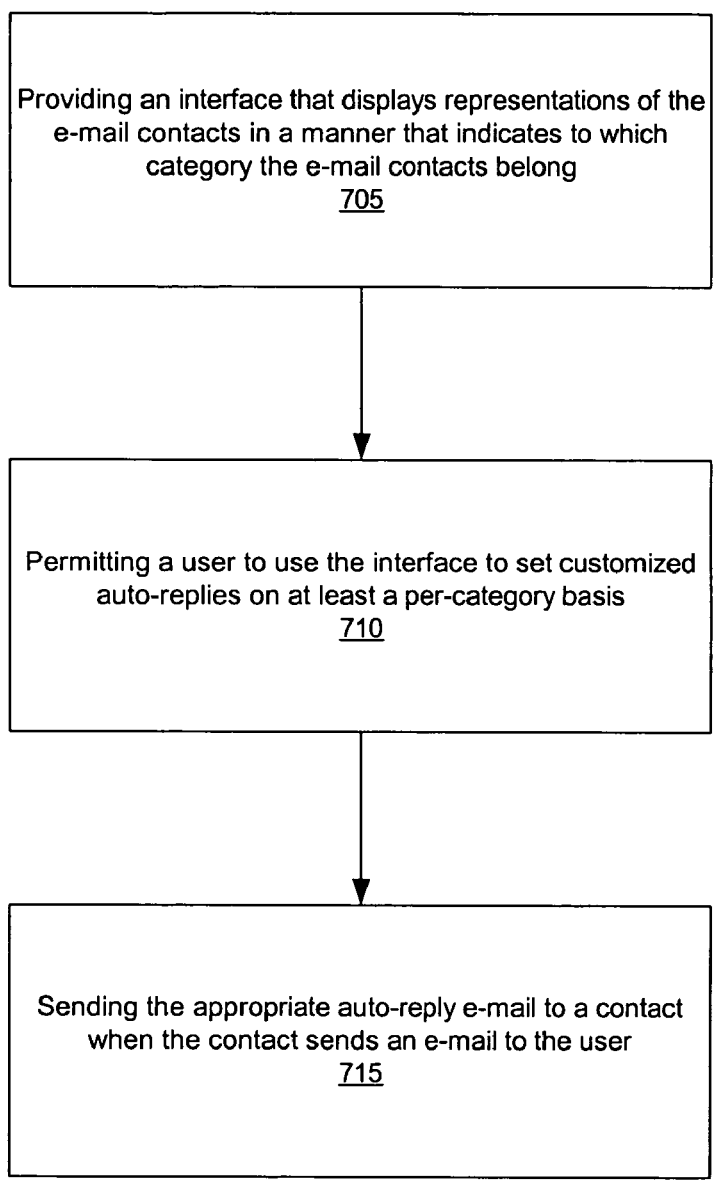
FIG. 7 is a flow chart illustrating a method for providing customized auto-replies to contacts that send e-mails to a user when the user has configured an e-mail client program or server to be in an auto-reply mode.

FIG. 7 is a flow chart illustrating a method 700 for providing customized auto-replies to contacts that send e-mails to a user when the user has configured an e-mail client program or server to be in an auto-reply mode. An interface is provided to the user (705). The interface allows the user to organize his or her contacts into categories. The interface also may display representations of the contacts in a manner that indicates into which category the contacts are organized. The interface may be a graphical user interface (GUI) and may be composed of one or more windows in a windowing-based graphical environment (e.g., Microsoft Windows, Macintosh, X Windows).

The user may use the interface provided to set customized auto-reply messages on at least a per-category basis (710). To set a customized auto-reply message for a category, the user may use the interface to select the category and enter in a message that will be used for the e-mail contacts that belong to the selected category. In other implementations, in addition to setting auto-reply messages on a per-category basis, the user may be able to use the interface to set a global auto-reply message and/or personal auto-reply messages on a per-contact basis. A global auto-reply message is a default auto-reply message sent to a contact if no other type of auto-reply message (e.g., category auto-reply message or personal autoreply message) is set for the contact. A personal auto-reply message is a message that is set for a particular contact and only used for that contact.

In some implementations that allow for global auto-reply messages, a category auto-reply may be set by overriding the global auto-reply message with a new message or by appending an additional message to the global auto-reply message. For example, if the global auto-reply message is set to "I am on vacation for the week.", then a category auto-reply message may be set by appending "In an emergency, I can be reached at (202) 555-1212." to the global auto-reply message. In this case, the auto-reply message set for contacts in the selected category would be "I am on vacation for the week. In an emergency, I can be reached at (202) 555-1212." If the category auto-reply message was set by replacing the global auto-reply message, the auto-reply message set for contacts in the selected category would be "In an emergency, I can be reached at (202) 555-1212." Similarly, in some implementations that allow for personal auto-reply messages, the personal auto-reply messages may be set by appending a new message to the category auto-reply message (or global auto-reply message, if implemented and no category auto-reply message exists) or by overriding a category auto-reply message or a global auto-reply message for particular contacts.

Appending may be implemented by concatenating each new message to the higher level message and storing the resulting message as the personal or category auto-reply message. Following the example above, in this case the message "In an emergency, I can be reached at (202) 555-1212." is concatenated to the message "I am on vacation for the week." when the user chooses to append. The resulting message then is stored as the category away message, which is sent to contacts in the category while the e-mail client program is configured in an auto-reply mode.

Alternatively, appending may be implemented by storing each message separately and concatenating each of the messages just prior to sending the auto-reply message to a contact. Following the example above, in this case the message "I am on vacation for the week." is stored as the global auto-reply message and the message "In an emergency, I can be reached at (202) 555-1212." is stored separately as the group auto-reply message, along with an indicator that the group auto-reply message is to be appended to the global auto-reply message. The group auto-reply message is concatenated to the global auto-reply message just prior to sending the auto-reply message to a contact in the category. The message resulting from the concatenation then is sent to the contact.

Also in some implementations that allow for global auto-reply messages, the user may be allowed to set a particular global auto-reply message for members of the user's contacts (e.g., if they are on the user's list), and a different global auto-reply for people who are not a part of the user's contacts (e.g., not on the user's contact lists). For example, a global auto-reply message such as "I am unable to check my e-mail" may be set for people who are not members of the user's contact list, while a global auto-reply message that provides more or other information (such as "I am on vacation until Dec. 19") may be set for people on the user's contact list.

Default global auto-reply messages, default category auto-reply messages, or default personal auto-reply messages may be provided, depending on the implementation. For example, if certain categories are provided as a default upon installation of the e-mail client program, a default category auto-reply message also may be provided for the categories. As another example, a default global auto-reply message may be provided when the e-mail client program is installed so that an auto-reply message always exists for contacts, regardless of whether a user has personalized any auto-reply messages, category or personal. Similarly, a default category auto-reply message may be provided for any default categories and newly created categories, whether or not a global auto-reply message is provided. This enables an auto-reply message to always exist for contacts even when no global auto-reply message exists, regardless of whether a user has set a category auto-reply message (or personal auto-reply message, if implemented also).

When a contact sends an e-mail to the e-mail user (the intended recipient) while the e-mail client program (or server) is in an auto-reply mode, the appropriate auto-reply message is sent to the contact (715). For example, in an implementation that supports global auto-reply messages, category auto-reply messages, and personal auto-reply messages, a personal auto-reply message is sent to the contact, if set; otherwise, or additionally, a category auto-reply message is sent, if set; otherwise, or additionally, a global auto-reply message is sent, if set. As another example, in an implementation that supports global auto-reply messages and category auto-reply messages, the category auto-reply message for the category that includes the contact is sent, if set; otherwise, or additionally, the global auto-reply message is sent, if set. In an implementation that only supports category auto-reply messages, the category auto-reply message for the category that includes the contact is sent to the contact, if set.

If the contact belongs to more than one category, then the appropriate category auto-reply may be the one associated with the first category the contact is a part of, either the first category in terms of which category the contact was first made a part of, or in terms of a predetermined priority of categories. Alternatively, the user may be able to select which category auto-reply has priority and is the appropriate category auto-reply to be sent when the contact is a member of more than one category.

FIGS. 8A-8J are illustrations showing exemplary e-mail and corresponding interfaces for setting customized auto-reply messages.

Figure 8A:
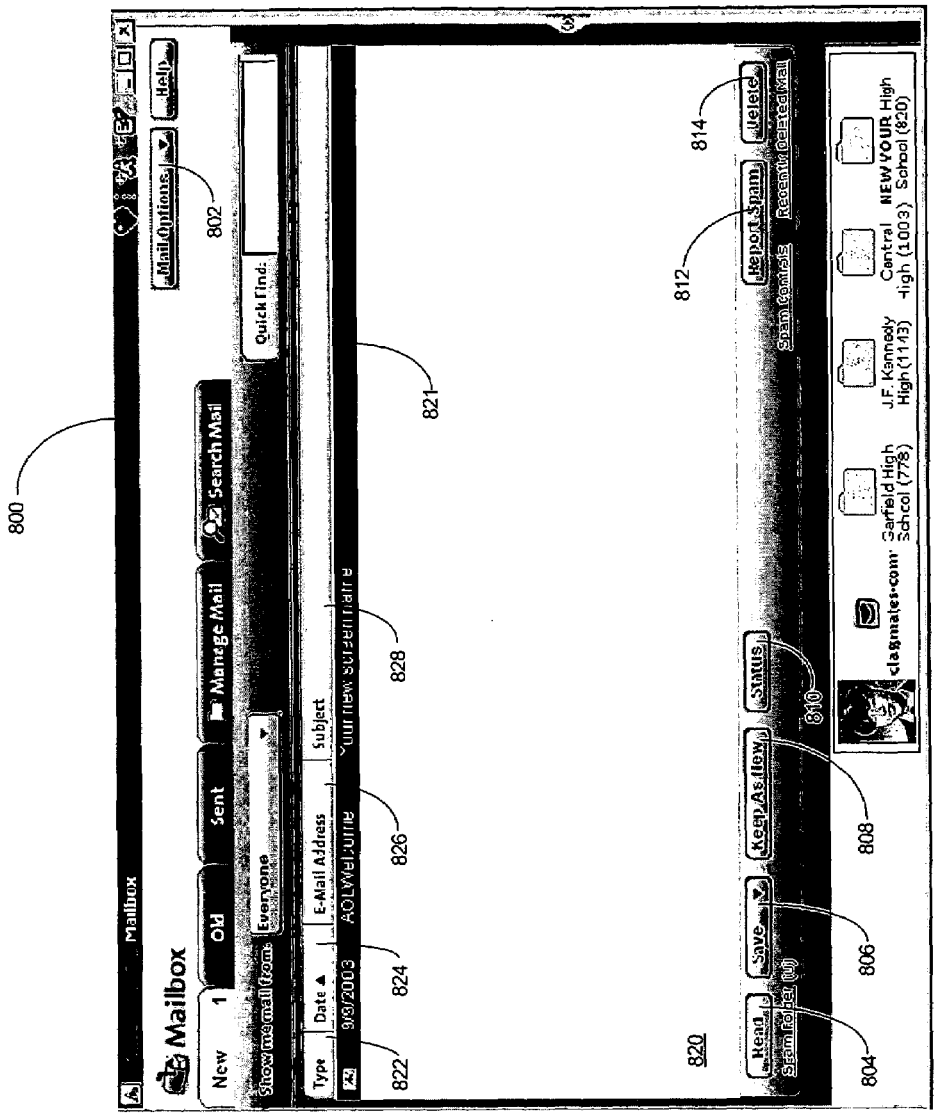
FIGS. 8A-8J are illustrations showing exemplary e-mail and corresponding interfaces for setting customized auto-replies.

Referring to FIG. 8A, an e-mail client program has an interface 800 that allows an e-mail user to read, write, and organize e-mails. Interface 800 includes a list box 820 that lists new e-mails. Partial information of each new e-mail is displayed on a separate line of list box 820. The partial information includes the e-mail type (e.g., bulk e-mail, e-mail from known senders, or e-mail from unknown senders), the date the e-mail was received, the sender's address, and the subject of the e-mail. The partial information on each line may be displayed in a manner that indicates whether the user has read the corresponding e-mail or not. For example, the partial information for unread e-mails may be displayed in bold text, while the partial information for read e-mails is displayed in normal text. In the illustrated interface 800, a single new e-mail 821 is listed in list box 820.

Each item of the partial information is displayed in a different column, where each column is marked by a button. Illustrated is a button 822 for e-mail type, a button 824 for date received, a button 826 for the sender's address, and a button 828 for the subject. Selecting one of the buttons 822-828 causes the e-mail to be sorted according to the information in the corresponding column. For example, if date button 824 is selected, the e-mail in list box 820 is sorted according to date received. Selecting date button 824 once sorts in descending order, while selecting date button 824 a second consecutive time causes the e-mail to be sorted in ascending order.

Interface 800 also has buttons 804-814 for performing various operations related to e-mail. A user may open an e-mail by selecting an e-mail from list box 820 and selecting read button 804. Opening an e-mail results in a second interface window being invoked, as shown in FIG. 8D. The second interface window displays the body or message contained in the e-mail.

An e-mail may be saved to the user's computer (or on an e-mail server, depending on the implementation) by selecting the e-mail and then selecting save button 806. Selecting an e-mail and then selecting keep as new button 808 causes the e-mail to be marked as new, even after the user has read the e-mail. Selecting an e-mail and then selecting a status button 810 invokes a window that displays status information such as when the e-mail was sent and when the e-mail was read. A report spam button 812 allows a user to indicate to the e-mail service provider that a given e-mail is spam. A delete button 814 allows a user to delete a selected e-mail. Selecting a mail options button 802 provides a list (not shown) of e-mail related actions (e.g., write e-mail or open an address book). To perform one of the actions, the user selects the corresponding action from the list.

Figure 8B:
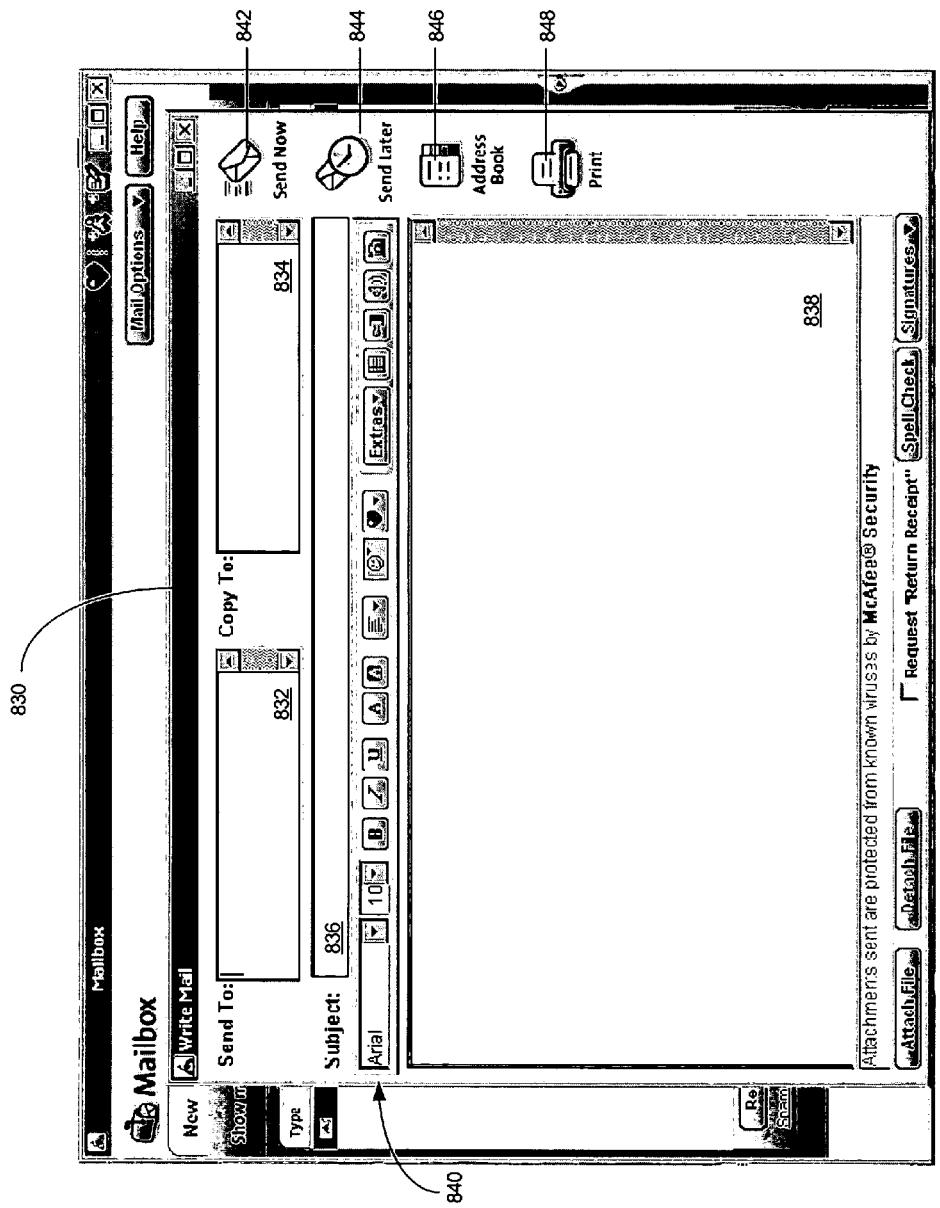

Referring to FIG. 8B, selecting a write e-mail option from the list invokes a second interface window 830 that enables a user to compose and send a new e-mail. Interface 830 includes an edit box 832 for designating recipient addresses to which the e-mail will be sent and an edit box 834 for designating recipient addresses to which a copy will be sent. The user can select recipient addresses from an address book (described further with respect to FIG. 8E), which can be invoked using address book button 846. Edit box 836 allows a user to designate a subject for the e-mail. A user can compose the body of the e-mail message in edit box 838.

Interface 830 also includes a formatting toolbar 840 that allows a user to format the text in the body of the e-mail and to insert graphics, sounds, or other multimedia components into the e-mail. When a user has finished composing the e-mail, the user can send the e-mail immediately by selecting the send now button 842 or have the e-mail saved to be sent in the future by selecting the send later button 844.

Selecting a print button 848 causes a copy of the composed e-mail to be printed.

A user may use interface 830 to compose an e-mail and send the e-mail to an intended recipient who has set his or her e-mail client program or server in an auto-reply mode. In this situation, the intended recipient's e-mail client program or server sends a reply e-mail to the user that includes an auto-reply message in the body.

Figure 8C:
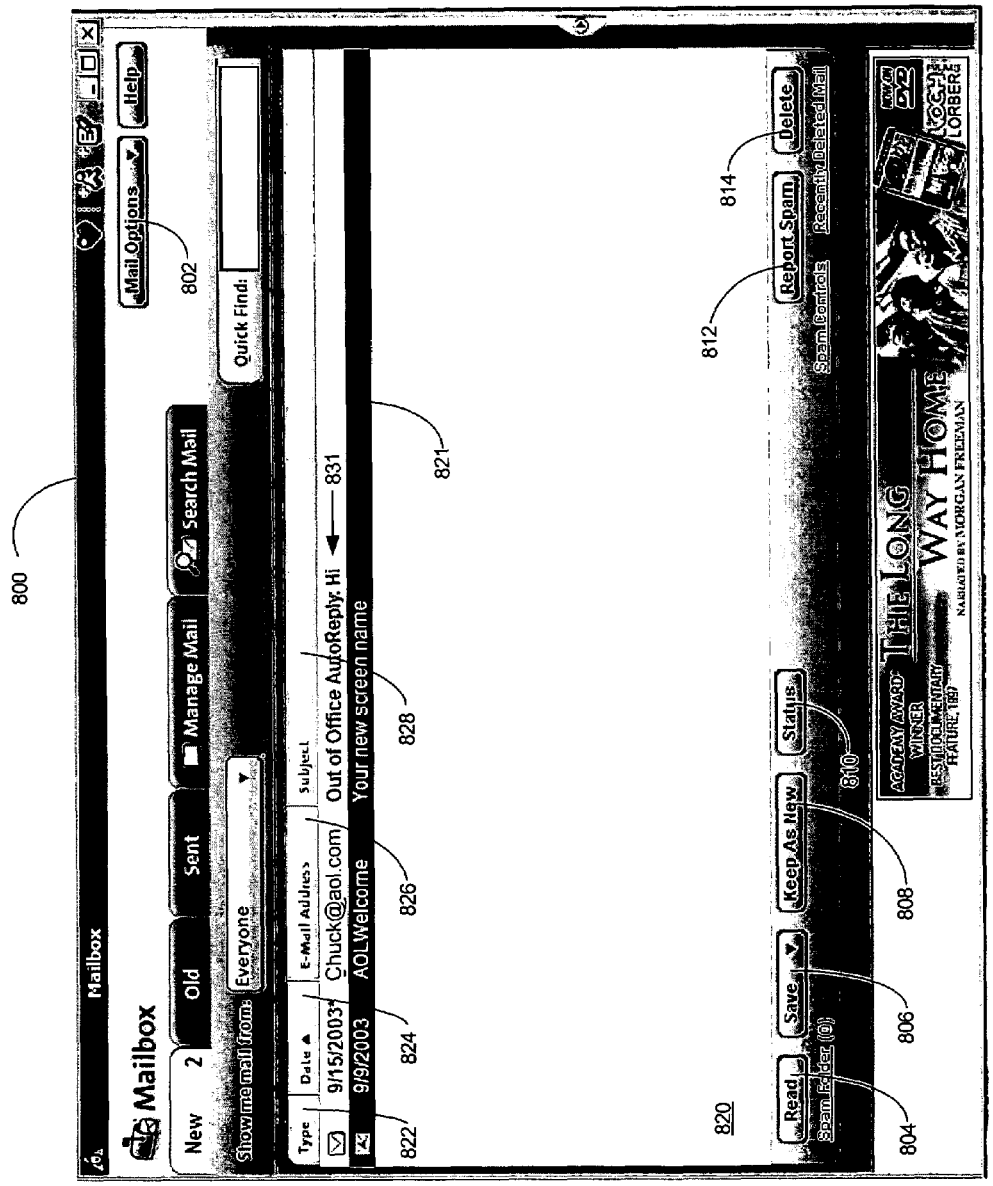
Figure 8D:
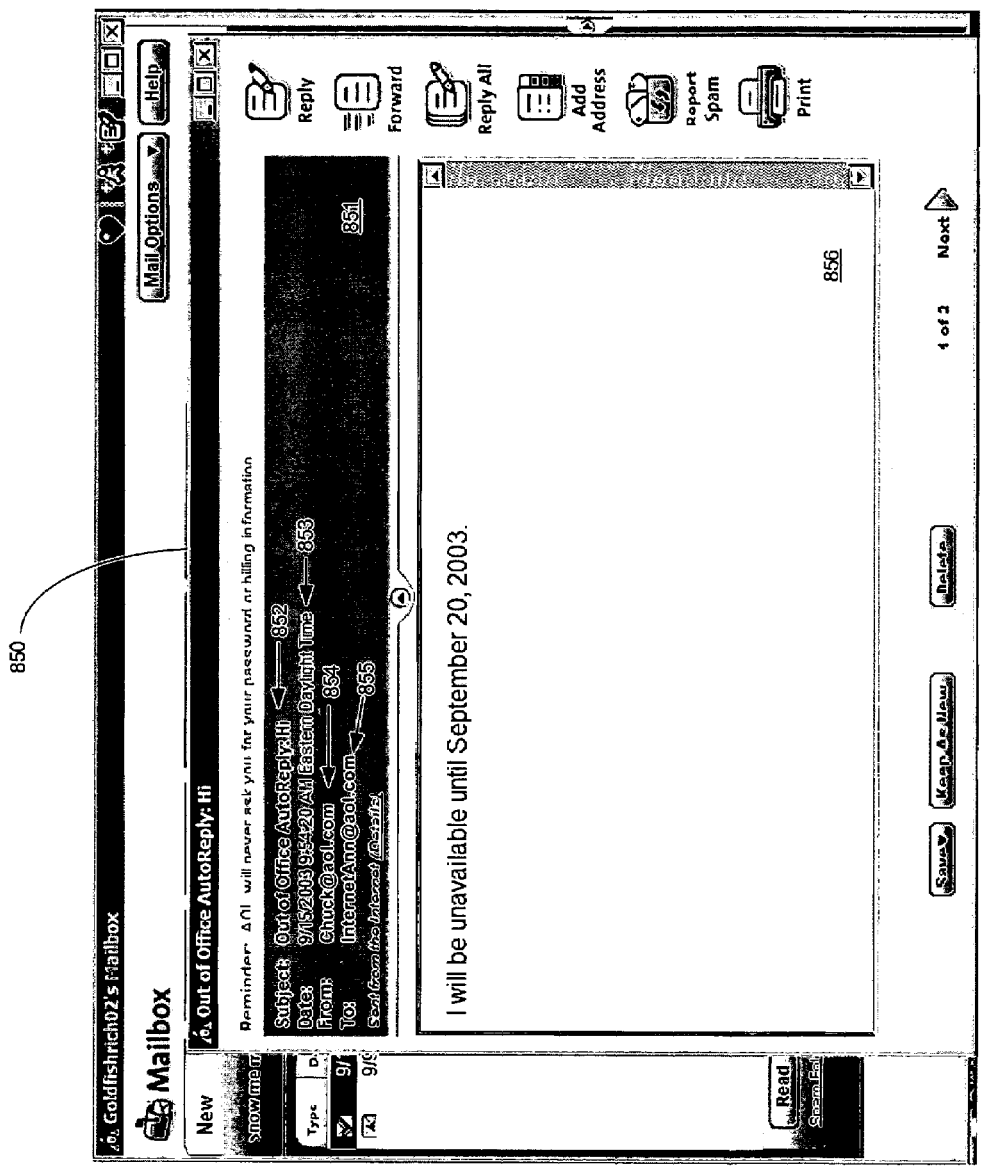

FIG. 8C illustrates interface 800 after an auto-reply e-mail has been sent to the user of interface 800. By way of example, the user of interface 800 has an e-mail address of InternetAnn@aol.com and has sent an e-mail to Chuck@aol.com. An auto-reply e-mail 831 was sent from Chuck@aol.com to InternetAnn@aol.com and is listed in list box 820. As shown, the subject of the auto-reply e-mail indicates that the e-mail is an "Out of Office AutoReply."

Referring to FIG. 8D, selecting e-mail 831 and read button 804 results in a read interface window 850 being invoked. Interface 850 shows the body of the auto-reply e-mail, including the auto-reply message. Interface 850 includes a header area 851, which provides information about the auto-reply e-mail such as subject 852, date received 853, sender's address 854, and the intended recipient's address 855. A text box 856 also is included. Text box 856 displays the body of the e-mail, which, in this case, is the auto-reply message "I will be unavailable until Sep. 20, 2003."

Figure 8E:
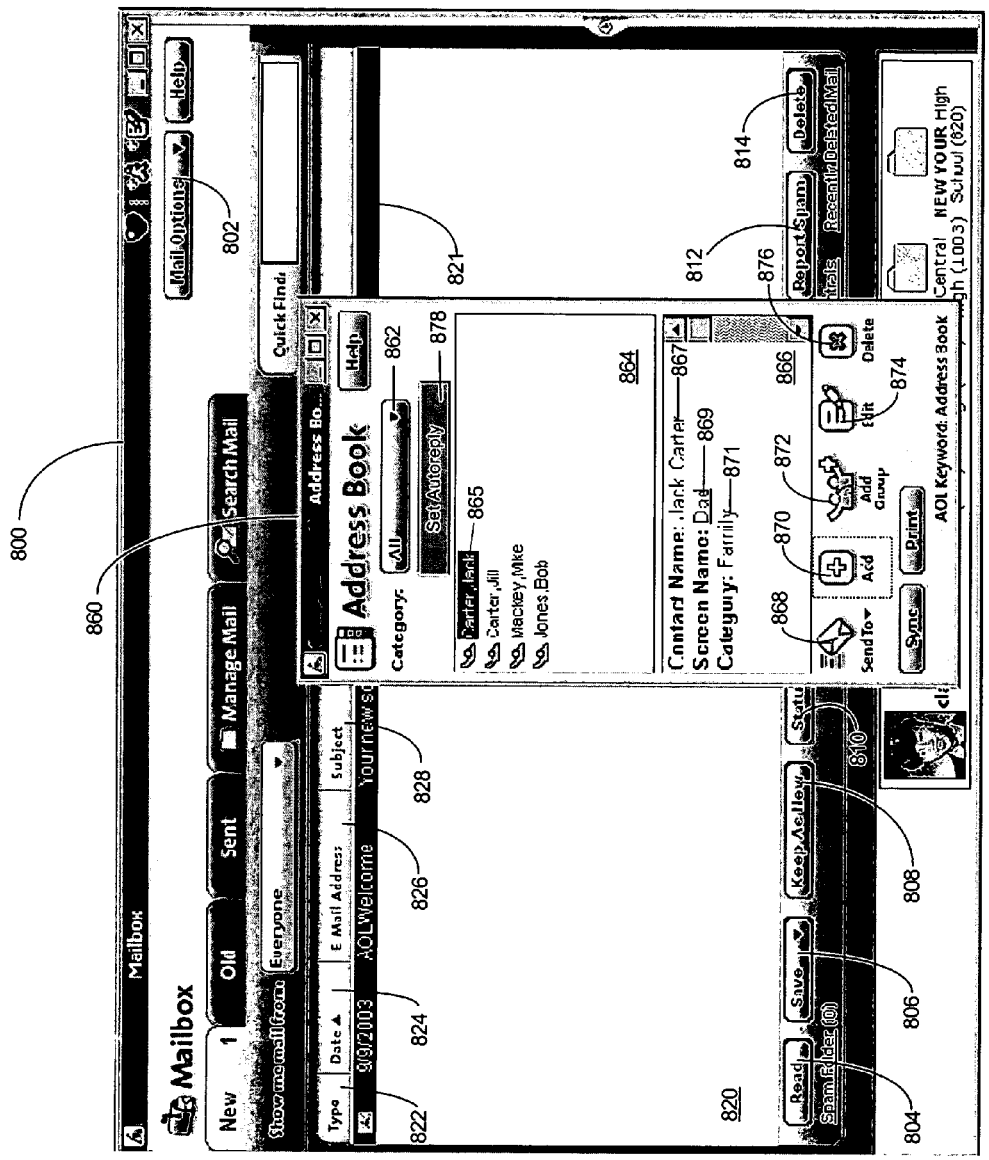

Referring to FIG. 8E, an e-mail user may keep his or her contacts in an electronic address book. An address book contains contact information about the contacts, such as an e-mail address, name, phone number, and/or address. As described above, the address book may be used to select recipient addresses to which a new e-mail will be sent.

The address book also may be used to set customized auto-reply messages on at least a per-category basis. The e-mail user can assign a category (e.g., family, friends, co-workers) to each contact in the address book. The user can then select one of the categories that contacts are assigned to and set a customized auto-reply message. When e-mails are received from the contacts in the category while the e-mail client program (or server) is in an auto-reply mode, an auto-reply e-mail containing the customized auto-reply is sent to the contact sending the e-mail.

As with the instant messaging client program, the e-mail client program may be explicitly placed into an auto-reply mode by the user. For example, the e-mail client program may have, for example, an "Auto-reply" or "Mail Away Message" menu item that the user can select to place the instant messaging client program into an auto-reply mode. The e-mail client program (or e-mail server) also may enter an auto-reply mode automatically in response to various factors. For example, the e-mail client program may enter an auto-reply mode automatically when there has not been any input to the client system for a predetermined period of time. Further, auto-replies may be handled, for example, by e-mail server 106 whenever a user is not logged on or otherwise connected to e-mail server 106.

FIG. 8E illustrates an interface 860 for an address book, which may be invoked, for example, using address book button 846 (FIG. 8B) or by selecting an open address book option from the list provided by the mail options button 802. Address book interface 860 includes a list box 864 in which the names of contacts are listed. A text box 866 displays contact information for a selected contact.

Interface 860 also includes buttons 868-876 for performing operations related to the listed contacts. A Send To button 868 allows a user to send an e-mail to a selected contact. Selecting a contact in list box 864 and then selecting Send To button 868 invokes interface 830 (FIG. 8B) with the e-mail address of the selected contact already included in the send to edit box 832.

A user may add a new contact to address book 860 by selecting Add button 870. Selecting Add button 870 invokes an interface (not shown) that allows a user to add in the contact information and designate a category for the new contact.

An e-mail distribution list may be defined using Add Group button 872. An e-mail distribution list is a grouping of e-mail addresses that is referenced by a single designation. This allows an e-mail user to select multiple recipient addresses for an e-mail without manually adding each contact to the send to edit box 832 of interface 830 (FIG. 8B). Instead, the e-mail user selects the single designation from the address book 860 and then selects Send To button 868. Interface window 830 then is invoked with the recipient addresses of each address included in the distribution list already added to the send to box 832 of interface 830.

The user can edit the information for an existing contact by selecting the contact in text box 864 and then selecting Edit button 874. Selecting Edit button 874 brings up an interface (not shown) similar to the one for creating the contact. A contact can be deleted by selecting the contact in text box 864 and then selecting Delete button 876.

In the illustrated interface 860, the contact Jack Carter is selected (as shown by the name 865 being highlighted in list box 864). Thus, contact information of Jack Carter is listed in text box 866. As shown, the contact information includes the contact name 867 and the IM screen name 869 of the contact.

Other contact information that may be listed includes e-mail address, telephone number, and street address.

Also shown in text box 866 is the category to which the contact belongs. The e-mail user can assign a category (e.g., family, friends, co-workers) to each contact in the address book 860. The categories may be default categories that are automatically provided upon installation of the e-mail client program, or they may be manually created categories. Further, there may be a combination of both, i.e., there are some default categories provided, along with the capability to define new categories.

A category button 862 allows a user to sort the contacts listed in text box 864 by category. That is, category button 862 allows a user to designate a particular category and only those contacts in the designated category are shown in list box 864. The current designation in FIG. 8E is "All," which indicates that all contacts should be shown. Consequently, all contacts are listed in list box 866.

Figure 8F:
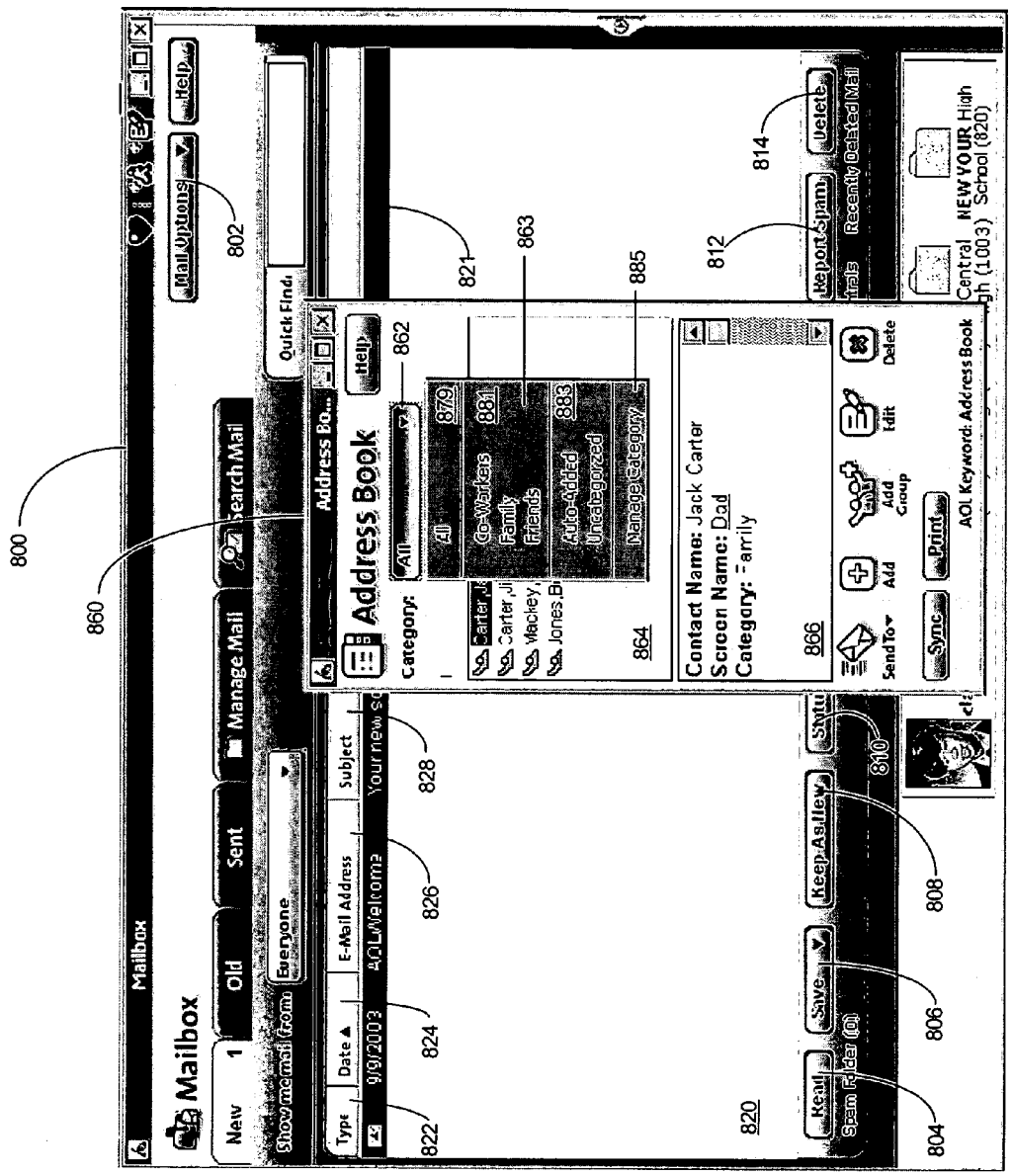

Referring to FIG. 8F, selecting category button 862 produces a dropdown menu 863. Menu 863 includes a first area 879 that includes an option for selecting "All" to designate that all contacts are to be listed. A second section 881 includes a list of different categories, which, in the interface shown, includes Co-Workers, Family, and Friends. Selecting one of the categories results in contacts of that category being displayed in list box 866.

Section 883 includes options for limiting the display of contacts to those that have been auto-added or that are uncategorized. E-mail contacts may be automatically added to the address book when, for example, a user writes an e-mail to the contact for the first time (and the contact has not already been manually added to the address book). The display of contacts in list box 864 can be limited to just those contacts that have been auto-added by selecting the auto-added option in section 883. Also, the user may not provide categories for some of the contacts. Selecting the uncategorized option in section 883 limits the display of contacts in list box 864 to these uncategorized contacts.

A manage category option is listed in a fourth section 885. The manage category option invokes an interface (not shown) that allows a user to add, edit and delete categories.

Figure 8G:
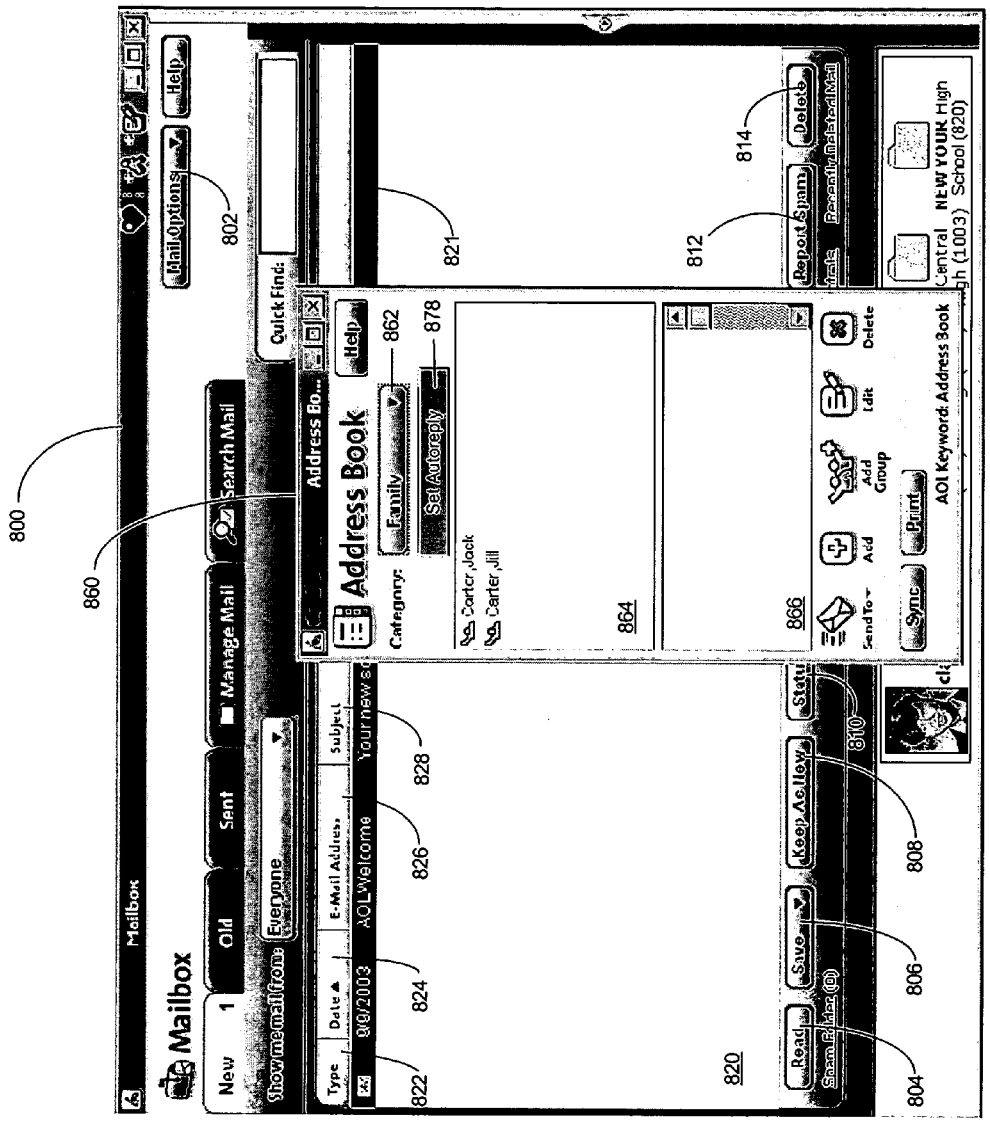

FIG. 8G shows the results of selecting one of the categories (the Family category) listed in section 881. As seen in FIG. 8E, prior to the selection of the Family category, four contacts were listed in list box 864: Jack Carter, Jill Carter, Mike Mackey, and Bob Jones. Jack and Jill Carter are categorized in the Family category, while Mike Mackey is categorized in the Co-Worker category, and Bob Jones is categorized in the Friends category. Consequently, as shown in FIG. 8G, after the Family category is selected, only Jack Carter and Jill Carter are displayed in list box 864 (because they are the only two contacts in the Family category).

Figure 8H:
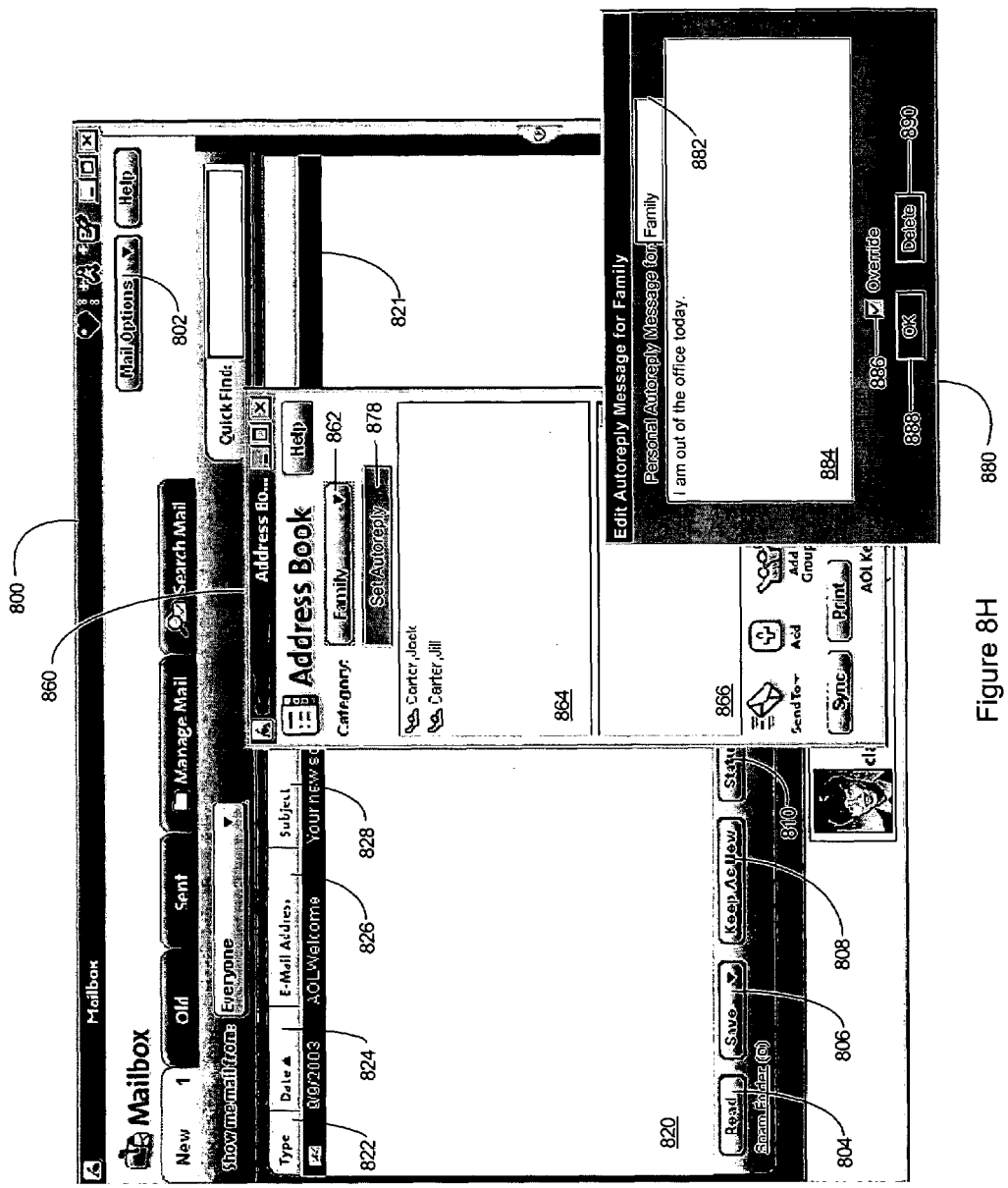

Referring to FIG. 8H, an auto-reply message for the presently displayed category (i.e., the category selected by category button 862) can be set by selecting a set auto-reply button 878. Selecting set auto-reply button 878 invokes a dialog box 880, which is similar to dialog box 410 (FIG. 4B). Dialog box 880 includes a text box 882 that contains the name of the category for which the category auto-reply message is being set (e.g., Family), and which allows for entry/selection of other categories for which category auto-reply messages are desired. Dialog box 880 also includes an edit box 884 into which the user may enter text for the category auto-reply message. A checkbox 886 may be used to indicate whether the text entered into the edit box 884 for the category auto-reply message is being appended to a global auto-reply message or if the text is replacing the global auto-reply message.

When checkbox 886 is checked, the text entered into the edit box 884 replaces the global auto-reply message, while the text is appended to the global auto-reply message when the checkbox 886 is not checked.

An OK button 888 is used to set the category auto-reply message using the text entered into edit box 884. Thus, when checkbox 886 is checked and the OK button 888 is selected, the category auto-reply message is set to just the text entered into the edit box 884. When the checkbox 886 is unchecked and the OK button 888 is selected, the category auto-reply message is set to the global away message with the text entered into the edit box 425 appended thereto.

Selecting a delete button 890 deletes any entered text from edit text box 884 and removes the group away message.

A user can set a global auto-reply by using dialog box 880 to set an auto-reply message for "All." For example, a user may select the All option 879 from drop-down box 863 and invoke dialog box 880 with the All category in text box 862 by selecting the set auto-reply button 878. The user then may input a global auto-reply message and select OK button 888.

Figure 8I:
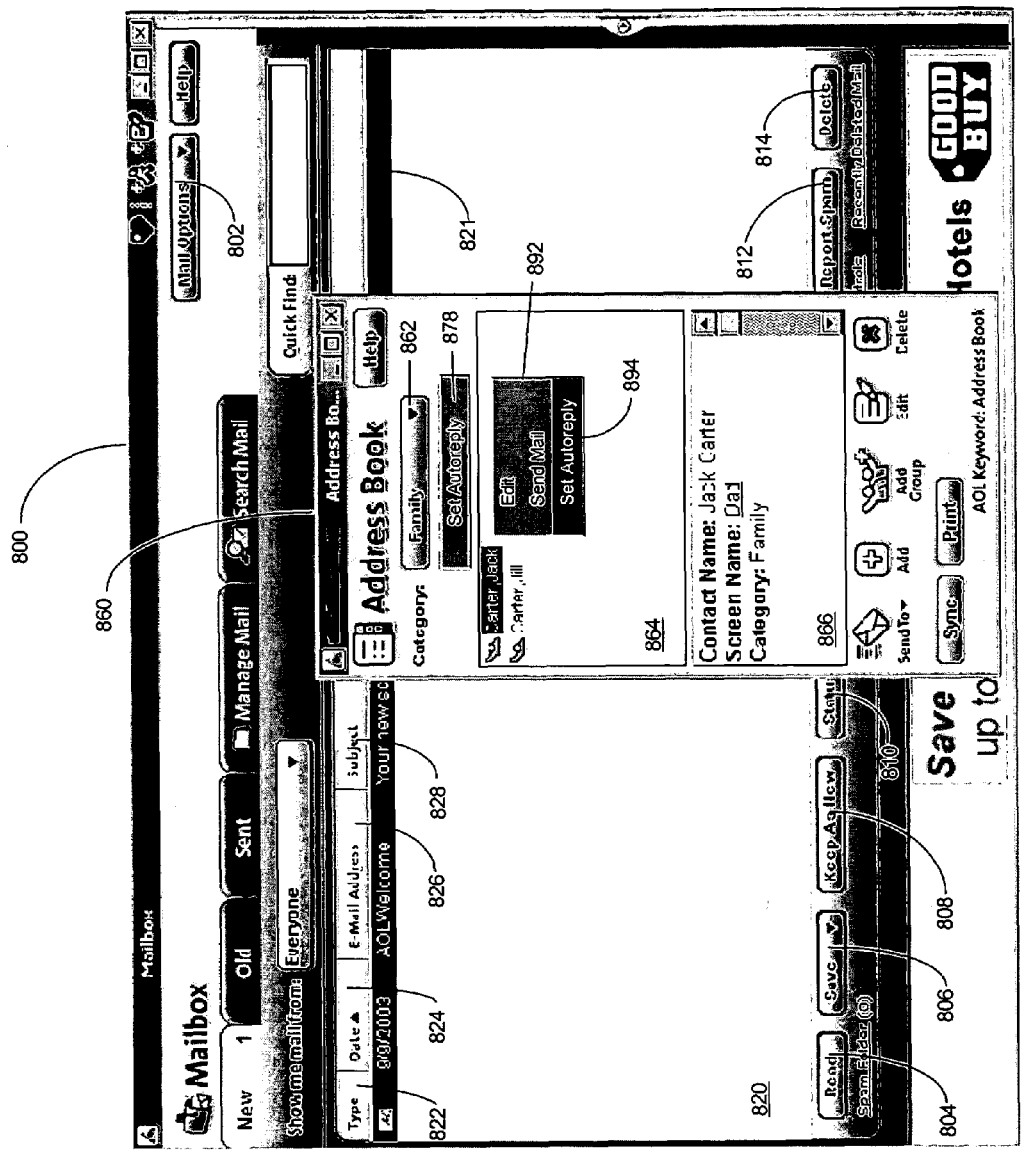

Referring to FIG. 8I, address book interface 860 also enables a user to set auto-reply messages on a per-contact basis. For example, a context menu 892 may be invoked by using a mouse to select a contact, for example Jack Carter, and clicking a button on the mouse. Context menu 892 provides several options for actions that can be performed. A set auto-reply option 894 allows the user to set a personal auto-reply message for the contact selected.

Figure 8J:
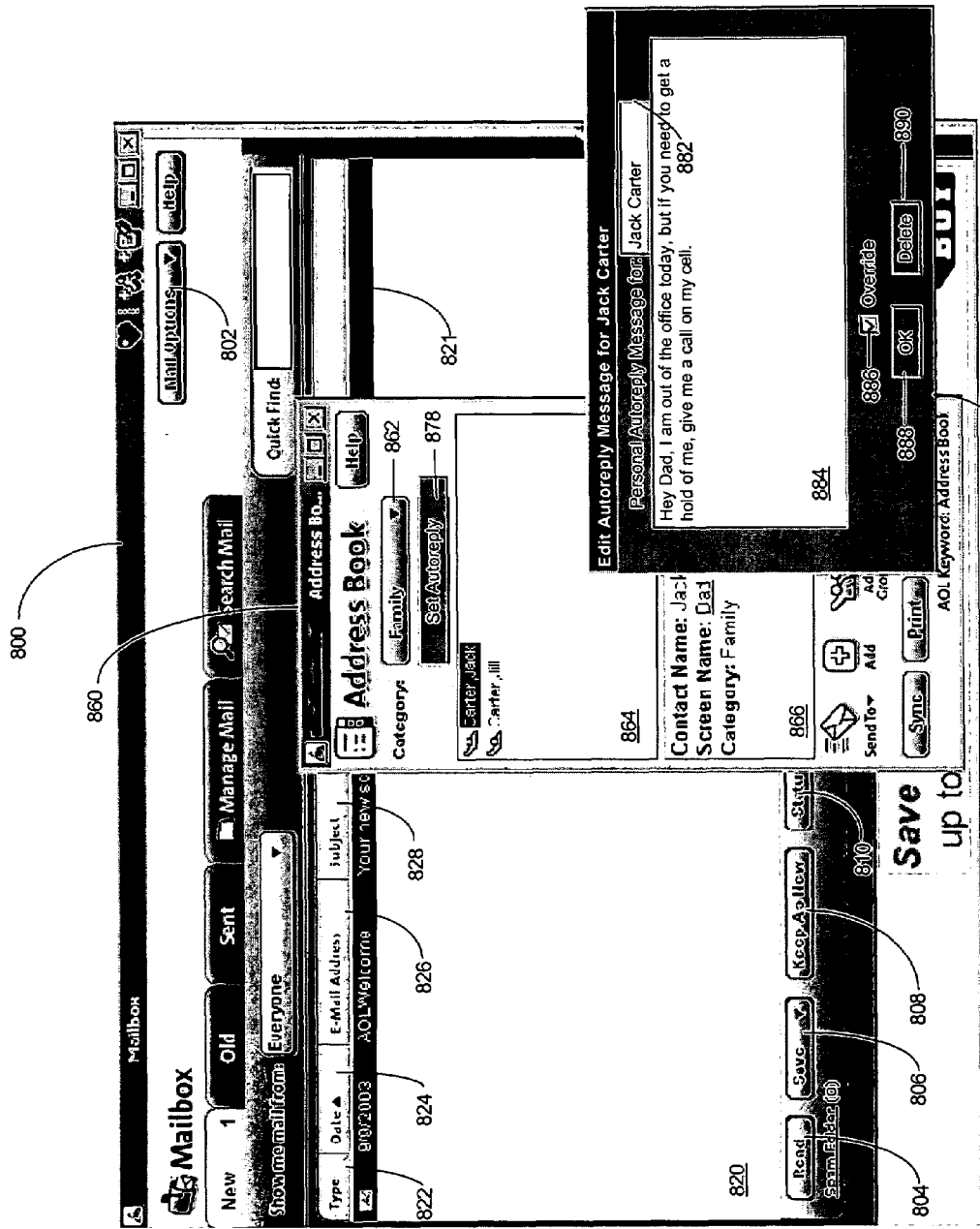

Referring to FIG. 8J, selecting the set auto-reply option 894 invokes the dialog box 880, which performs as described above, except that it now includes the name of the selected contact (in the example shown, Jack Carter).

As with dialog boxes 410 and 510 (FIGS. 4B and 5B, respectively), the text box 882 of dialog 880 may be an edit box such that the contact name can be edited by the user, with the changes applied to the contact or category entered. In such an implementation, for instance, if a user originally invokes the dialog box for the Family category, the edit box contains the name "Family." After the user has entered and set the category auto-reply message for Family, the user can then delete "Family" from the edit box and enter, e.g., "Jack Carter." After entering "Jack Carter," the user then may use the dialog box to enter and set a personal auto-reply message for Jack Carter. Also, box 882 may be a combo-box instead of a text box such that a drop-down menu of contacts and categories is provided, similar to that described with respect to FIG. 5C.

Figure 9A:
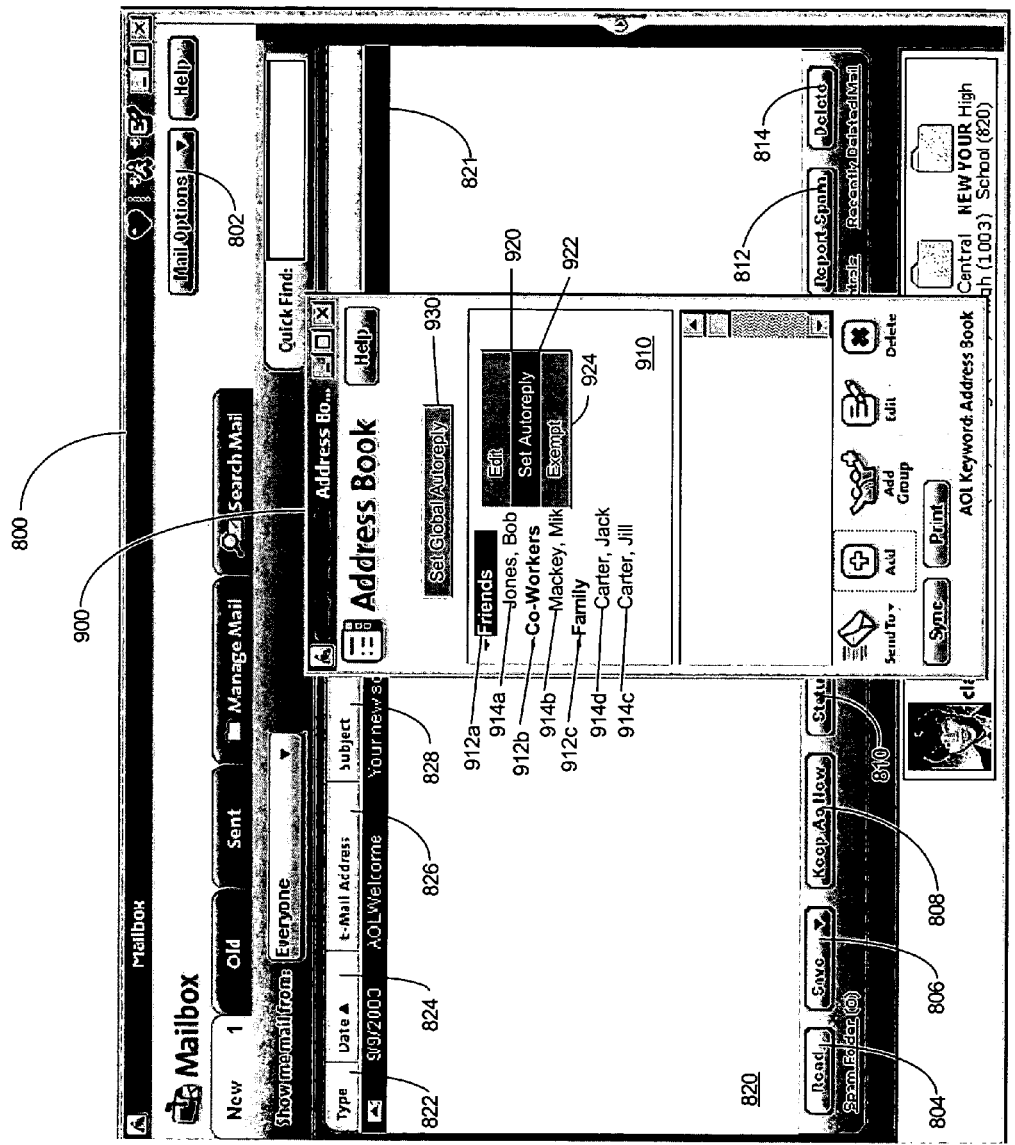
FIGS. 9A and 9B show another implementation of an address book interface that allows a user to set auto-reply messages on at least a per-category basis.
Figure 9B:
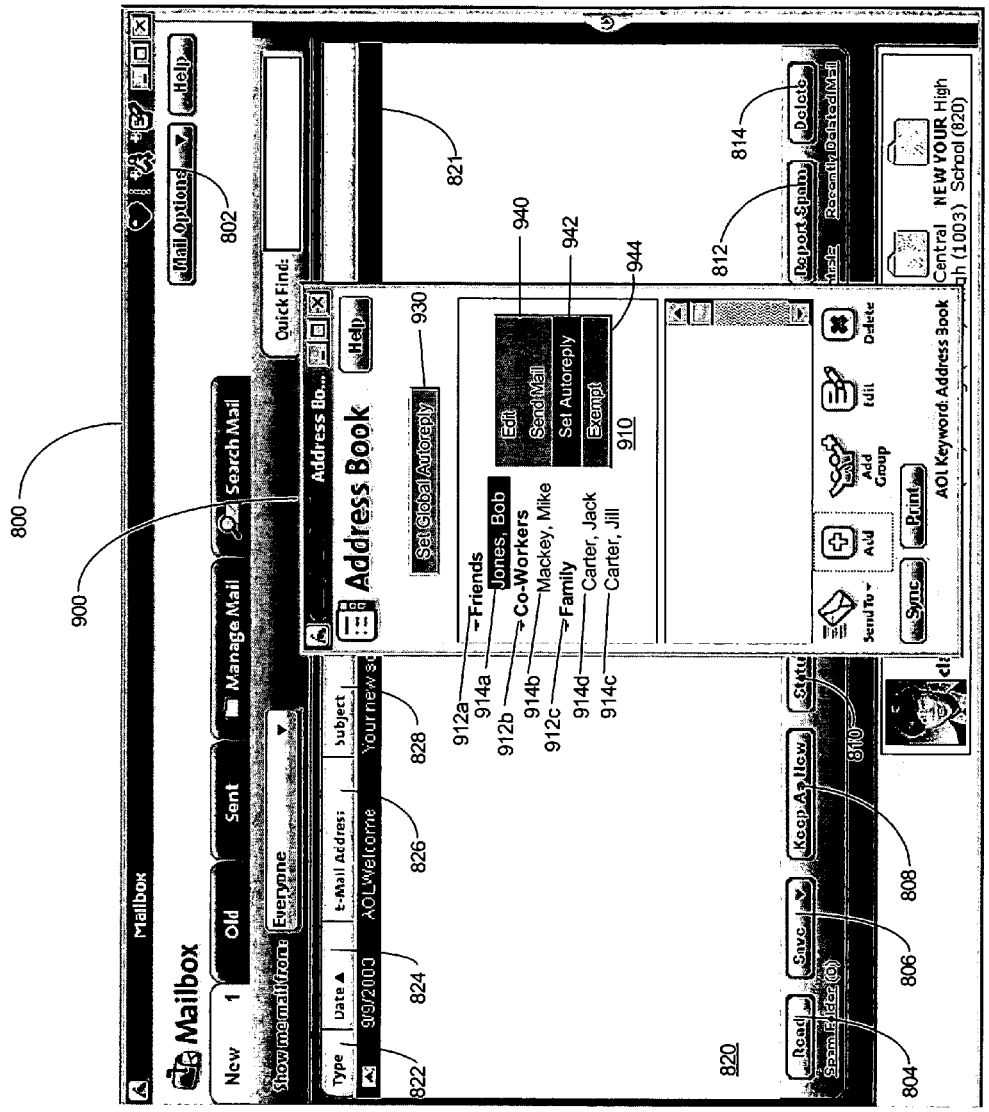

FIGS. 9A and 9B show another implementation of an address book interface 900 that allows a user to set auto-reply messages on at least a per-category basis. Interface 900 is similar to interface 860, except that interface 900 does not have a category button 862 or a set auto-reply button 880.

Interface 900 displays contacts and categories in a tree-structure, similar to IM interface 205. The contacts and categories are displayed in a list box 910. In list box 910, each contact is grouped together under the category to which the contact belongs. For example, in the interface shown by FIG. 9A, the contact Bob Jones belongs to the Friends category and, consequently, the representation 914*a* for Bob Jones is listed under the representation 912*a* for the Friends category. Likewise, the contact Mike Mackey is part of the Co-Workers buddy group and, consequently, the representation 914*b* for Mike Mackey is listed under the representation 912*b* for the Co-Workers category. Similarly, the contacts Jack Carter and Jill Carter are part of the Family category and, consequently, their representations 914*c* and 914*d* are listed under the representation 912*c* for the Family category.

Address book interface 900 enables a user to set auto-reply messages on a per-category and a per-contact basis. For a category auto-reply message, a context menu 920 may be invoked, for example, by using a mouse to select a representation of a category, for example the representation 912a for the Friends category, and clicking a button on the mouse. Context menu 920 provides several options for actions that can be performed. A set auto-reply option 922 allows the user to set a category auto-reply message for the category selected. Selecting the set auto-reply option 922 invokes a dialog box (not shown) which functions similar to dialog box 880.

A user also may be able to set a single category auto-reply message for multiple categories by selecting multiple categories at once and then selecting the set auto-reply option 922. For example, in one implementation a user can select multiple categories by holding down a control button on a keyboard and selecting multiple categories with a mouse. After selecting the multiple categories, the user invokes context menu 920 and selects set auto-reply option 922, which invokes a dialog box similar to dialog box 880. When the user sets the auto-reply message using the invoked dialog box, the auto-reply message is set for each selected category.

A user also may exempt categories from the global auto-reply. As described above, when an auto-reply is not set for a category, the global auto-reply is sent instead. At times, however, a user may wish that no auto-replies, category or global, are sent to a particular category. Context menu 920 contains an exempt option 924. Selecting one or more categories and then selecting exempt option 924, causes the selected categories to be exempt from the global auto-reply message, i.e., a global auto-reply message will not be sent to those contacts in the selected categories.

Similarly, referring to FIG. 9B, for a personal auto-reply message, a context menu 940 (which can be the same context menu as menu 920 or a different context menu) may be invoked, for example, by using a mouse to select a representation of a contact, for example the representations 914a for the Bob Jones, and clicking a button on the mouse. Selecting a set auto-reply option 942 also invokes a dialog box (not shown) which functions similar to dialog box 880.

Interface 900 also includes a set global auto-reply button 930 for setting a global auto-reply message. Selecting button 930 invokes a dialog box, similar to dialog box 880, for setting global auto-reply messages.

As with the categories, a user also may be able to set a single personal auto-reply message for multiple contacts by selecting multiple categories at once and then selecting the set auto-reply option 942. In addition, a user also may exempt contacts from global and category auto-replies. At times a user may wish that no auto-replies, category, global or personal, are sent to a particular contact. Context menu 940 contains an exempt option 944. Selecting one or more categories and then selecting exempt option 924, causes the selected categories to be exempt from auto-reply messages, i.e., auto-reply messages will not be sent to those contacts.

While an address book interface has been illustrated as the interface that allows users to set auto-reply messages, other interfaces may be used. There may be a specific interface designed for auto-reply messages. Alternatively, an instant messaging interface also may be designed to allow users to set customized auto-reply messages (either in addition to or absent of the ability to set customized away messages), particularly where the IM and e-mail services are provided by the same provider (e.g., America Online).

Figure 10A:
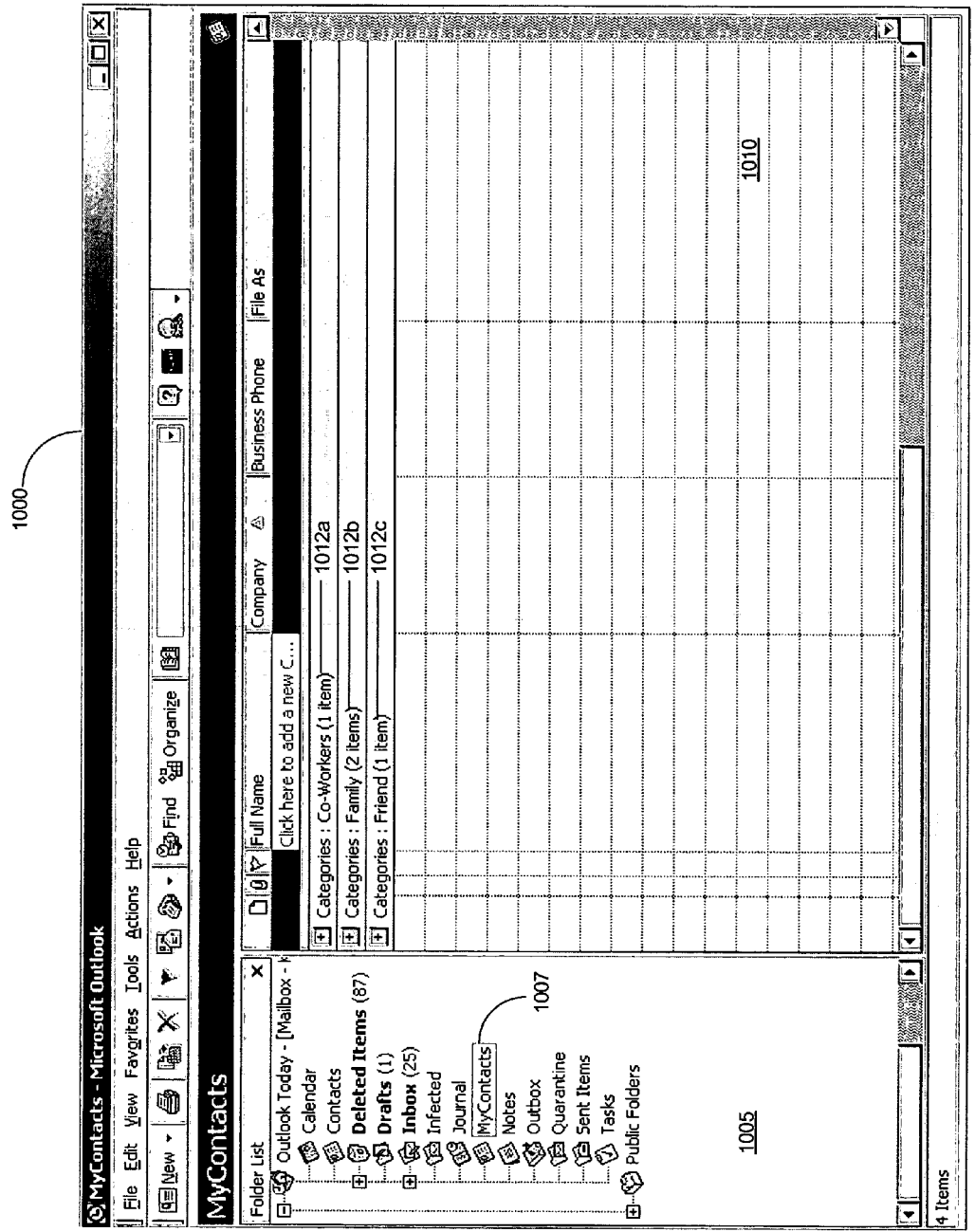
FIGS. 10A and 10B show an implementation of a stand-alone e-mail client that allows a user to set auto-reply messages on at least a per-category basis.
Figure 10B:
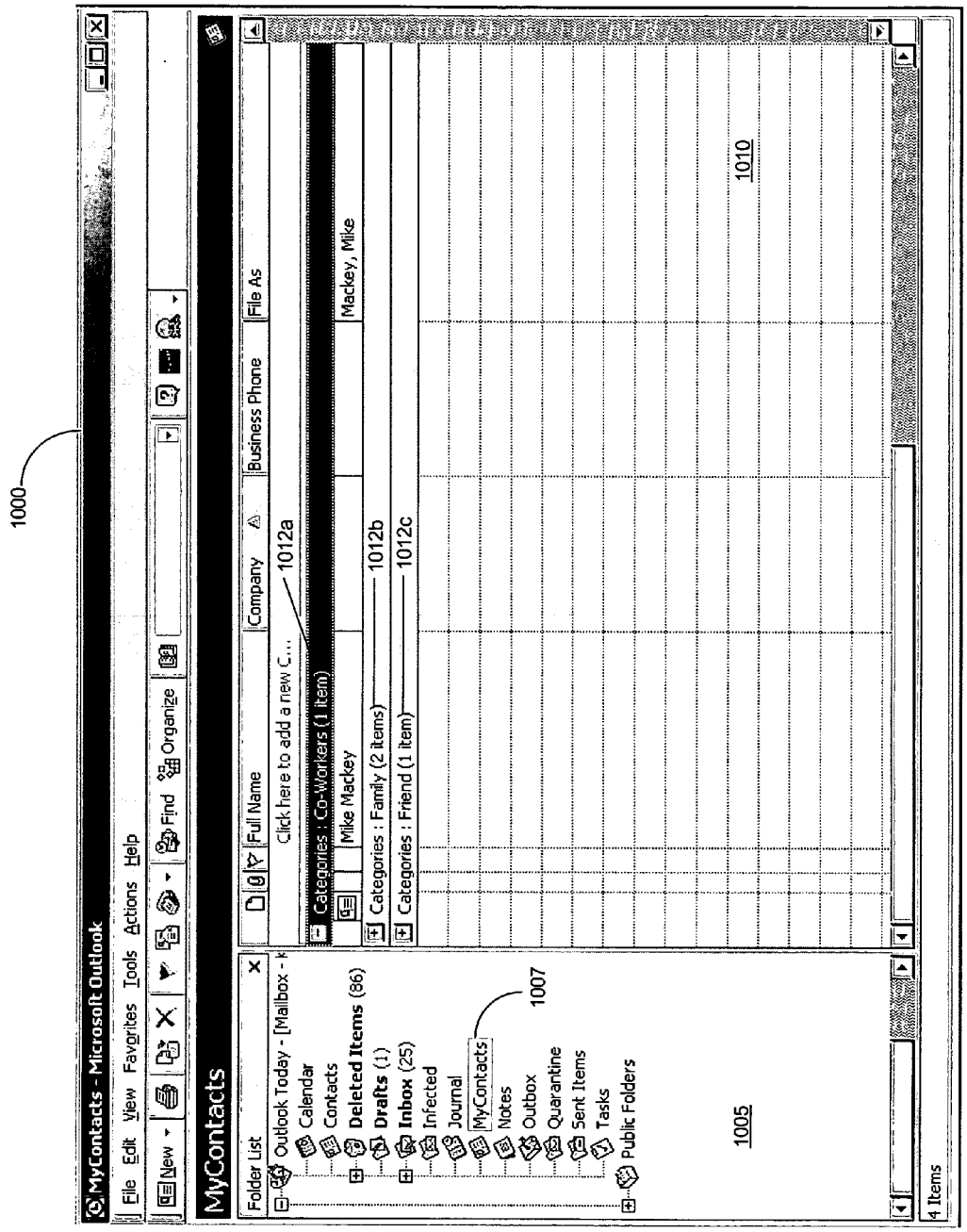

FIGS. 10A and 10B show an implementation of a stand-alone e-mail client that allows a user to set auto-reply messages on at least a per-category basis. E-mail client includes an interface 1000 that includes a window 1005 for selecting between contact information (e.g., by selecting MyContacts folder 1007) and other information stored by the e-mail client (e.g., e-mail in an e-mail inbox).

Interface 1000 also includes a window 1010 that displays contacts when MyContacts folder 1007 is selected. Window displays contacts and categories in a tree-structure, similar to interface 900. As shown in FIG. 10A, when the tree structure is collapsed, only the categories 1012a, 1012b, and 1012c are displayed. Referring to FIG. 10B, any of the categories can be expanded to show the contacts in the expanded category. For example, in the interface shown in FIG. 10B, the Co-Workers category is expanded, the contact Mike Mackey 1014a in the Co-Workers category 1012a is shown.

Similar to interface 900, interface 1000 enables a user to set auto-reply messages on a per-category and a per-contact basis. In one implementation, to set auto-reply messages, a context menu may be invoked, for example, by using a mouse to select a representation of a category or contact and clicking a button on the mouse. Context menu may provide several options for actions that can be performed, including the options of setting auto-replies for the selected category or contact or for a global auto-reply.

While a context menu has been described for setting auto-replies, as with the other interfaces, other mechanism may be used. Also, other functions may be provided such as the ability to set a single category auto-reply message for multiple categories or to exempt categories or contacts from the global or category auto-replies.

In some implementations, for example when multiple communication services such as e-mail, instant messaging, and internet telephony are provided by a single provider, the user may be given the ability to turn on away messaging, auto-replies, and answering services for more than one of the multiple communication services by a single interface or command. For example, the user may be provided with an interface that allows the user to indicate that he or she is away and, once the user so indicates, more than one (or all) of IM away messaging, e-mail auto-replies, and telephony answering services are enabled. Alternatively, or additionally, for example, when the user turns on one of an IM away messaging, an e-mail autoreplies, or a telephony answering service, the other services may be turned on automatically as a result. That is, for instance, when a user turns on his or her away messaging, his or her e-mail auto-replies and telephony answering service is turned on automatically also.

Also, in some implementations, when a user sets one service, such as his or her away message, the set message is used to automatically set the other messages, such as the e-mail auto-replies and a telephony answering service message. For instance, when a user sets his or her away message, the text used to set the away message may be used to set an e-mail auto reply for the same contacts or categories and a text-to-speech conversion may be used to obtain a spoken message which is set as a telephony answering service message for the same contacts or categories.

A number of implementations have been described. Nevertheless, it will be understood that various modifications may be made. Accordingly, other implementations are within the scope of the following claims.

What is claimed is:

1. A computer-usable storage medium storing an e-mail client program that allows a user to set customized auto-reply messages, the program comprising:

a first interface element that allows a user to organize contacts into categories;

a second interface element that allows the user to set a category auto-reply message for a category, wherein the set category auto-reply message is sent to contacts that are organized into the category for which the category auto-reply message is set when an e-mail is received from the contacts that are organized into the category for which the category auto-reply message is set;

a third interface element that allows the user to select a contact in the category;

a fourth interface element that allows the user to set a personal auto-reply message for the selected contact, wherein the personal auto-reply message is sent to the selected contact when an e-mail is received from the selected contact, and the category auto-reply is additionally sent to the selected contact when an e-mail is received from the selected contact; and a fifth interface element that allows the user to set a global auto-reply reply message, wherein the global auto-reply message is sent to contacts that are organized into categories for which a category auto-reply message has not been set.

2. The medium of claim 1 further comprising a third interface element that displays contacts in a manner that indicates into which category the contacts are organized.

3. A computer-usable storage medium having a computer program embodied thereon for providing customized auto-reply messages, the computer program comprising instructions for causing a computer to perform the following operations:

receive, from a user, user input to organize one or more contacts into one or more categories;

receive, from the user, user input to set a global auto-reply message;

receive, from the user, user input to set a category auto-reply message for at least one category included in the one or more categories;

receive, from the user, user input to set a personal auto-reply message for at least one contact included in the one or more contacts, the at least one contact being organized in the at least one category; and in response to receiving an e-mail from the at least one contact, process the set auto-reply messages for the at least one contact by: sending the personal auto-reply message, the category auto-reply message, and the global auto-reply message to the at least one contact.

4. The computer-usable storage medium of claim 3 wherein the computer program further comprises instructions for causing a computer to provide an interface that displays representations of the one or more categories and representations of the one or more contacts, wherein the representations of the categories and the representations of the contacts are displayed in a manner that indicates which contact is organized into which category.

5. The computer-usable storage medium of claim 3 wherein, to set a personal auto-reply message, the computer program further comprises instructions for causing a computer to set a personal auto-reply message to be appended as an additional message on to a category auto-reply message if the category auto-reply message has been set for the category into which the contact is organized.

6. The computer-usable storage medium of claim 3 wherein, to set a personal auto-reply message, the computer program further comprises instructions for causing a computer to set a personal auto-reply message to be sent in addition to a category auto-reply message if the category auto-reply message has been set for the category into which the contact is organized.

7. The computer-usable storage medium of claim 3 wherein, to set a category auto-reply message, the computer program further comprises instructions for causing a computer to set a category auto-reply message to be appended as an additional message on to the global auto-reply message.

8. The computer-usable storage medium of claim 3 wherein, to set a category auto-reply message, the computer program further comprises instructions for causing a computer to set a category auto-reply message to be sent in addition to the global auto-reply message.

9. A computer-usable storage medium having a computer program embodied thereon for providing customized auto-reply messages, the computer program comprising instructions for causing a computer to perform the following operations:

permit a user to organize contacts into categories;

permit the user to select a category;

permit the user to set a category auto-reply message for the selected category, wherein the set category auto-reply message is sent to contacts that are organized into the selected category when an e-mail is received from the contacts that are organized into the selected category;

permit the user to select a contact that is organized into the selected category; and permit the user to set a personal auto-reply message for the selected contact, wherein the personal auto-reply message is sent to the selected contact, in addition to the category auto-reply message, when an e-mail is received from the selected contact, wherein the computer program further comprises instructions for causing a computer to permit the user to set a global auto-reply message, wherein the global auto-reply message is sent to contacts that are organized into categories for which no category auto-reply message has been set and for which no personal auto-reply message has been set.

10. The computer-usable storage medium of claim 9 wherein the computer program further comprises instructions for causing a computer to permit the user to perceive the contacts organized into categories.

11. The computer-usable storage medium of claim 9 wherein the computer program further comprises instructions for causing a computer to display representations of the contacts and the categories in a manner that indicates the categories into which the contacts are organized.

12. The computer-usable storage medium of claim 9 wherein, to set a personal auto-reply message, the computer program further comprises instructions for causing a computer to set a personal auto-reply message to be appended as an additional message on to the category auto-reply message.

13. A computer-usable storage medium having a computer program embodied thereon for providing customized auto-reply messages, the computer program comprising instructions for causing a computer to perform the following operations:

permit a user to organize contacts into categories;

permit the user to select a category;

permit the user to set a category auto-reply message for the selected category, wherein the set category auto-reply message is sent to contacts that are organized into the selected category when an e-mail is received from the contacts that are organized into the selected category;

permit the user to select a contact that is organized into the selected category; and permit the user to set a personal auto-reply message for the selected contact, wherein the personal auto-reply message is sent to the selected contact, in addition to the category auto-reply message, when an e-mail is received from the selected contact, wherein the computer program further comprises instructions for causing a computer to permit the user to set a global auto-reply message, wherein the global auto-reply message is sent to contacts that are organized into categories for which a category auto-reply message has not been set.

14. The computer-usable storage medium of claim 13 wherein, to set a category auto-reply message, the computer program further comprises instructions for causing a computer to set a category auto-reply message to be appended as an additional message on to the global auto-reply message.

15. A method for providing customized auto-reply messages, the method comprising:

permitting a user to organize contacts into categories;
permitting the user to select a category;
permitting the user to set a category auto-reply message for the selected category, wherein the set category auto-reply message is sent to contacts that are organized into the selected category when an e-mail is received from the contacts that are organized into the selected category;
permitting the user to set a global auto-reply message, wherein the global auto-reply message is sent to contacts that are organized into categories for which a category auto-reply message has not been set; and
sending the set category auto-reply message in addition to the global auto-reply message when an e-mail is received from the contacts that are organized into the selected category.

16. A computer-usable storage medium storing an e-mail client program that allows a user to set customized auto-reply messages, the program comprising:

a first interface element that allows a user to organize contacts into categories;
a second interface element that allows the user to set a category auto-reply message for a category, wherein the set category auto-reply message is sent to contacts that are organized into the category for which the category auto-reply message is set when an e-mail is received from the contacts that are organized into the category for which the category auto-reply message is set; and
a third interface element that allows the user to set a global auto-reply message, wherein the global auto-reply message is sent to contacts that are organized into categories for which a category auto-reply message has not been set, and the global auto-reply message is additionally sent when an e-mail is received from the contacts that are organized into the category for which the category auto-reply message is set.

17. A computer-usable storage medium having a computer program embodied thereon for providing customized auto-reply messages, the computer program comprising instructions for causing a computer to perform the following operations:

permit a user to organize contacts into categories;
permit the user to select a category;
permit the user to set a category auto-reply message for the selected category, wherein the set category auto-reply message is sent to contacts that are organized into the selected category when an e-mail is received from the contacts that are organized into the selected category; and permit the user to set a global auto-reply message, wherein the global auto-reply message is sent to contacts that are organized into categories for which a category auto-reply message has not been set, and the category auto-reply message is appended as an additional message on to the global auto-reply message when an e-mail is received from the contacts that are organized into the selected category.

18. A method for providing customized auto-reply messages, the method comprising:

receiving, from a user, user input to organize one or more contacts into one or more categories;
receiving, from the user, user input to set a global auto-reply message;
receiving, from the user, user input to set a category auto-reply message for at least one category included in the one or more categories;
receiving, from the user, user input to set a personal auto-reply message for at least one contact included in the one or more contacts, the at least one contact being organized in the at least one category; and
in response to receiving an e-mail from the at least one contact, processing the set auto-reply messages for the at least one contact by: sending the personal auto-reply message.

19. The method of claim 18 further comprising providing an interface that displays representations of the one or more categories and representations of the one or more contacts, wherein the representation of the category and the representation of the contact are displayed in a manner that indicates which contacts are organized into which categories.

20. The method of claim 18 wherein setting a personal auto-reply message comprises setting a personal auto-reply message that is appended as an additional message on to a category auto-reply message if the category auto-reply message has been set for the category into which the contact is organized.

21. The method of claim 18 wherein setting a personal auto-reply message comprises setting a personal auto-reply message that is sent in addition to the category auto-reply message if the category auto-reply message has been set for the category into which the contact is organized.

22. The method of claim 18 wherein setting a category auto-reply message comprises setting a category auto-reply message that is appended as an additional message on to the global auto-reply message.

23. The method of claim 18 wherein setting a category auto-reply message comprises setting a category auto-reply message that is sent in addition to the global auto-reply message.

24. A method for providing customized auto-reply messages, the method comprising:

permitting a user to organize contacts into categories;
permitting the user to select a category;
permitting the user to set a category auto-reply message for the selected category, wherein the set category auto-reply message is sent to contacts that are organized into the selected category when an e-mail is received from the contacts that are organized into the selected category;

permitting the user to select a contact that is organized into the selected category;

permitting the user to set a personal auto-reply message for the selected contact;

sending the personal auto-reply message, in addition to the category auto-reply message, to the selected contact when an e-mail is received from the selected contact; and permitting the user to set a global auto-reply message, wherein the global auto-reply message is sent to contacts that are organized into categories for which no category auto-reply message has been set and for which no Personal auto-reply message has been set.

25. The method of claim 24 further comprising permitting the user to perceive the contacts organized into categories.

26. The method of claim 24 further comprising displaying representations of the contacts and the categories in a manner that indicates the categories into which the contacts are organized.

27. The method of claim 24 wherein setting a personal auto-reply message comprises setting a personal auto-reply message that is appended as an additional message on to the category auto-reply message.

28. The method of claim 15 wherein setting a category auto-reply message comprises setting a category auto-reply message to be appended as an additional message on to the global auto-reply message.

* * * * *